US012748814B2

(12) United States Patent
Xu

(10) Patent No.: US 12,748,814 B2
(45) **Date of Patent: *Sep. 29, 2026**

(54) METHOD, DEVICE AND WEARABLE PART EMBEDDED WITH SENSE CORE ENGINE UTILIZING BARCODE IMAGES FOR IMPLEMENTING COMMUNICATION

(71) Applicant: Wei Xu, Shanghai (CN)

(72) Inventor: Wei Xu, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,254

(22) Filed: Feb. 6, 2024

(65) Prior Publication Data

US 2024/0179206 A1 May 30, 2024

Related U.S. Application Data

(63) Continuation of application No. 17/197,716, filed on Mar. 10, 2021, now Pat. No. 11,936,714, which is a (Continued)

(30) Foreign Application Priority Data

Jul. 8, 2013 (CN) ........................ 201310284352.X

(51) Int. Cl.
*G06F 16/955* (2019.01)
*G06F 16/38* (2019.01)
(Continued)

(52) U.S. Cl.
CPC ........ *G06F 16/9554* (2019.01); *G06F 16/381* (2019.01); *G06K 7/1404* (2013.01);
(Continued)

(58) Field of Classification Search
CPC ......... H04L 67/01; H04L 67/02; H04L 67/10; G06F 16/381; G06F 16/9554; G06K 7/1417; G06K 7/1447; G06K 19/06037
See application file for complete search history.

(56) References Cited

U.S. PATENT DOCUMENTS 5,731,574 A * 3/1998 Bodie .............. G07B 17/00508
235/494
6,542,933 B1 4/2003 Durst
(Continued)

FOREIGN PATENT DOCUMENTS

CN 1578923 A 2/2005
CN 100362881 C 7/2005
(Continued)

OTHER PUBLICATIONS

Wikipedia Contributors, "Universal Product Code" Wikipedia, The Free Encyclopedia. Internet Archive. Jan. 1, 2013 https://web.archive.org/web/20130101061849/https://en.wikipedia.org/wiki/Universal_Product_Code.*

(Continued)

*Primary Examiner* — Brendan Y Higa
(74) *Attorney, Agent, or Firm* — Amster, Rothstein & Ebenstein LLP

(57) ABSTRACT

The present invention discloses a method and a device to communicate between a mobile terminal and at least two backend servers, and the method of the present invention includes the following steps: registering a user of the mobile terminal as a user of the first backend server; obtaining the coding information by the barcode image taken through decoding the mobile terminal; the first backend server parsing the coding information to determine whether the barcode image is generated according to a preset coding rule, if the barcode image is generated according to the preset coding rule, executing subsequent steps; if the barcode image is not generated according to the preset coding rule, stopping executing the method after the mobile terminal is connected to a webpage corresponding to the coding information; the mobile terminal extracting service information corresponding to the coding information according to the coding information; the second backend server pro- (Continued)

viding a service to the mobile terminal. The method and device of the present invention include multiple backend servers which cooperate to provide services for users of mobile terminal.

20 Claims, 20 Drawing Sheets

Related U.S. Application Data continuation of application No. 14/901,988, filed as application No. PCT/CN2014/000639 on Jul. 3, 2014, now Pat. No. 10,992,783.

(51) Int. Cl.
*G06K 7/14* (2006.01)
*G06K 19/06* (2006.01)
*H04L 67/01* (2022.01)
*H04L 67/02* (2022.01)
*H04L 67/10* (2022.01)

(52) U.S. Cl.
CPC ......... *G06K 7/1417* (2013.01); *G06K 7/1447* (2013.01); *G06K 19/06037* (2013.01); *H04L 67/01* (2022.05); *H04L 67/02* (2013.01); *H04L 67/10* (2013.01)

(56) References Cited

U.S. PATENT DOCUMENTS

| | | | | |
|---|---|---|---|---|
| 6,622,919 | B1 | 9/2003 | Wilz et al. | |
| 7,419,097 | B2 | 9/2008 | Lee et al. | |
| 8,215,541 | B2 * | 7/2012 | Bucher | G06F 21/43 235/472.01 |
| 8,430,310 | B1 | 4/2013 | Ho et al. | |
| 9,204,241 | B2 | 12/2015 | Xu | |
| 10,992,783 | B2 | 4/2021 | Xu | |
| 2003/0055913 | A1 | 3/2003 | Harkin et al. | |
| 2003/0159151 | A1 | 8/2003 | Ikeda | |
| 2005/0082370 | A1 | 4/2005 | Frantz et al. | |
| 2005/0283448 | A1 | 12/2005 | Dixon | |
| 2006/0065733 | A1 * | 3/2006 | Lee | H04M 1/2755 235/462.01 |
| 2006/0106643 | A1 | 5/2006 | Aarnio | |
| 2008/0195409 | A1 | 8/2008 | Shankland | |
| 2009/0108057 | A1 * | 4/2009 | Mu | H04M 1/72445 235/375 |
| 2010/0146463 | A1 | 6/2010 | Cho | |
| 2010/0327066 | A1 | 12/2010 | Khan | |
| 2011/0093943 | A1 | 4/2011 | Nakagawa | |
| 2011/0196783 | A1 | 8/2011 | Liwerant | |
| 2011/0207531 | A1 | 8/2011 | Gagner | |
| 2011/0231268 | A1 | 9/2011 | Ungos | |
| 2012/0008161 | A1 | 1/2012 | Rouhana | |
| 2012/0136698 | A1 | 5/2012 | Kent | |
| 2012/0136739 | A1 | 5/2012 | Chung | |
| 2012/0150750 | A1 | 6/2012 | Law | |
| 2012/0181330 | A1 | 7/2012 | Kim | |
| 2012/0190384 | A1 | 7/2012 | Marr | |
| 2012/0203646 | A1 | 8/2012 | Morgan | |
| 2012/0245985 | A1 | 9/2012 | Cho | |
| 2012/0252405 | A1 | 10/2012 | Lortz et al. | |
| 2012/0276880 | A1 | 11/2012 | Angorn | |
| 2013/0015236 | A1 | 1/2013 | Porter | |
| 2013/0018758 | A1 | 1/2013 | Balasubramanian | |
| 2013/0021374 | A1 | 1/2013 | Miao | |
| 2013/0043302 | A1 | 2/2013 | Powlen | |
| 2013/0048714 | A1 | 2/2013 | Sharma et al. | |
| 2013/0059534 | A1 | 3/2013 | Sobalvarro et al. | |
| 2013/0110597 | A1 | 5/2013 | Blair et al. | |
| 2013/0112746 | A1 * | 5/2013 | Krell | G06K 5/00 235/380 |
| 2013/0124413 | A1 | 5/2013 | Itwaru | |
| 2013/0124606 | A1 | 5/2013 | Carpenter et al. | |
| 2013/0167143 | A1 | 6/2013 | Yi | |
| 2013/0190039 | A1 * | 7/2013 | Lee | G06Q 50/12 455/552.1 |
| 2013/0223625 | A1 | 8/2013 | de Waal | |
| 2013/0278622 | A1 | 10/2013 | Sun | |
| 2014/0033273 | A1 | 1/2014 | Rathbun | |
| 2014/0120886 | A1 | 5/2014 | Xu | |
| 2014/0122563 | A1 | 5/2014 | Singh et al. | |
| 2014/0172531 | A1 | 6/2014 | Liberty | |
| 2014/0297787 | A1 | 10/2014 | Baugh et al. | |
| 2014/0359578 | A1 | 12/2014 | Jesse et al. | |
| 2014/0367461 | A1 | 12/2014 | Raina | |
| 2015/0009309 | A1 | 1/2015 | Heinrich | |
| 2015/0220766 | A1 * | 8/2015 | Russell | G06K 7/10881 235/462.42 |
| 2015/0248664 | A1 | 9/2015 | Makhdumi | |
| 2015/0324476 | A1 | 11/2015 | Malkin | |
| 2018/0075442 | A1 | 3/2018 | Tyler | |
| 2019/0243998 | A1 * | 8/2019 | Ford | G06K 7/10831 |
| 2019/0306275 | A1 | 10/2019 | Baugh et al. | |

FOREIGN PATENT DOCUMENTS

| | | | | |
|---|---|---|---|---|
| CN | 1778129 | | | 5/2006 |
| CN | 100465951 | C | | 5/2006 |
| CN | 1841425 | | | 10/2006 |
| CN | 101087356 | | | 12/2007 |
| CN | 101131758 | | | 2/2008 |
| CN | 101131758 | A | | 2/2008 |
| CN | 102156943 | A | | 8/2011 |
| CN | 102711057 | | | 10/2012 |
| CN | 102711057 | A | | 10/2012 |
| CN | 102821157 | | | 12/2012 |
| CN | 102821157 | A | | 12/2012 |
| CN | 202838423 | U | | 3/2013 |
| CN | 202838432 | U | | 3/2013 |
| CN | 103164412 | A | | 6/2013 |
| CN | 103414687 | | | 11/2013 |
| JP | 2004171417 | A | * | 6/2004 |
| JP | 2011209805 | A | | 10/2011 |
| KR | 1020050097839 | A | | 10/2005 |
| RU | 2172013 | C1 | | 8/2001 |
| RU | 74501 | | | 6/2008 |
| RU | 2327217 | C2 | | 6/2008 |
| RU | 2007009574 | A | | 12/2008 |
| RU | 2394275 | C2 | | 7/2010 |
| RU | 97199 | U1 | | 8/2010 |
| RU | 2009116232 | A | | 11/2010 |
| RU | 2009116232 | U | | 11/2010 |
| RU | 2444060 | C2 | | 2/2012 |
| RU | 2011120075 | | | 11/2012 |
| WO | 2007123328 | A1 | | 11/2007 |
| WO | 2009116954 | A2 | | 9/2009 |

OTHER PUBLICATIONS

Chinese Office Action dated May 8, 2020 issued in corresponding Chinese Application No. 201611151037.X.
Chinese Office Action dated Apr. 12, 2019 issued in corresponding Chinese Application No. 201611151037.X.
Chinese Office Action dated Oct. 27, 2015 issued in corresponding Chinese Application No. 201310284352.X.
Chinese Office Action dated Jun. 27, 2016 issued in corresponding Chinese Application No. 201310284352.X.
Chinese Office Action dated May 8, 2020 issued in corresponding Chinese Application No. 201611151870.4.
Chinese Office Action dated Apr. 15, 2019 issued in corresponding Chinese Application No. 201611151870.4.
Chinese Office Action dated May 8, 2020 issued in corresponding Chinese Application No. 201611152096.9.
Chinese Office Action dated Apr. 15, 2019 issued in corresponding Chinese Application No. 201611152096.9.
Chinese Office Action dated Apr. 3, 2019 issued in corresponding Chinese Application No. 201611165803.8.
Chinese Office Action dated May 12, 2020 issued in corresponding Chinese Application No. 201611165803.8.

(56) References Cited

OTHER PUBLICATIONS

Chinese Office Action dated Apr. 3, 2019 issued in corresponding Chinese Application No. 201611152106.9.
Chinese Office Action dated May 12, 2020 issued in corresponding Chinese Application No. 201611152106.9.
Chinese Office Action dated Apr. 9, 2019 issued in corresponding Chinese Application No. 201611154232.8.
Chinese Office Action dated Aug. 31, 2020 issued in corresponding Chinese Application No. 201611154232.8.
Chinese Office Action dated May 8, 2020 issued in corresponding Chinese Application No. 201611154233.2.
Chinese Office Action dated Apr. 15, 2019 issued in corresponding Chinese Application No. 201611154233.2.
Chinese Office Action dated Apr. 3, 2019 issued in corresponding Chinese Application No. 201611151234.1.
Chinese Office Action dated Jul. 24, 2020 issued in corresponding Chinese Application No. 201611151234.1.
Chinese Office Action dated Mar. 6, 2020 issued in corresponding Chinese Application No. 201611151234.1.
Chinese Office Action dated Mar. 20, 2019 issued in corresponding Chinese Application No. 201611154972.1.
Chinese Office Action dated Apr. 17, 2020 issued in corresponding Chinese Application No. 201611154972.1.
Chinese Office Action dated September 3. 2020 issued in corresponding Chinese Application No. 201611154972.1.
Chinese Office Action dated Sep. 1, 2020 issued in corresponding Chinese Application No. 201611154315.7.
Chinese Office Action dated Apr. 1, 2020 issued in corresponding Chinese Application No. 201611154315.7.
Chinese Office Action dated Apr. 15, 2019 issued in corresponding Chinese Application No. 201611154315.7.
Chinese Office Action dated Mar. 26, 2019 issued in corresponding Chinese Application No. 201611153415.8.
Chinese Office Action dated Jan. 21, 2020 issued in corresponding Chinese Application No. 201611153415.8.
Chinese Office Action dated Jun. 1, 2020 issued in corresponding Chinese Application No. 201611153415.8.
Chinese Office Action dated Apr. 9, 2019 issued in corresponding Chinese Application No. 201611155593.4.
Chinese Office Action dated Mar. 6, 2020 issued in corresponding Chinese Application No. 201611155593.4.
Chinese Office Action dated Nov. 6, 2019 issued in corresponding Chinese Application No. 201611155593.4.
Chinese Office Action dated Apr. 1, 2019 issued in corresponding Chinese Application No. 201611153405.4.
Chinese Office Action dated May 7, 2020 issued in corresponding Chinese Application No. 201611153405.4.
Chinese Office Action dated Apr. 15, 2019 issued in corresponding Chinese Application No. 201611155984.6.
Chinese Office Action dated Mar. 3, 2020 issued in corresponding Chinese Application No. 201611155984.6.
Chinese Office Action dated Sep. 2, 2020 issued in corresponding Chinese Application No. 201611155984.6.
Chinese Office Action dated Apr. 1, 2020 issued in corresponding Chinese Application No. 201611154337.3.
Chinese Office Action dated Apr. 15, 2019 issued in corresponding Chinese Application No. 201611154337.3.
Chinese Office Action dated Sep. 1, 2020 issued in corresponding Chinese Application No. 201611154337.3.
Chinese Office Action dated Apr. 10, 2019 issued in corresponding Chinese Application No. 201611155616.1.
Chinese Office Action dated May 8, 2020 issued in corresponding Chinese Application No. 201611155616.1.
Chinese Office Action dated Apr. 4, 2019 issued in corresponding Chinese Application No. 201611154234.7.
Chinese Office Action dated May 8, 2020 issued in corresponding Chinese Application No. 201611154234.7.
Great Britain Examination Report dated Jul. 8, 2020 issued in corresponding British Application No. 1521949.6.
Singapore Written Opinion dated Jul. 19, 2016 issued in corresponding Singapore Application No. 11201510153S.
Singapore Written Opinion dated Aug. 21, 2017 issued in corresponding Singapore Application No. 11201510153S.
Russian Search Report dated Oct. 19, 2019 issued in corresponding Russian Application No. 2019103539.
Russian Office Action dated Oct. 18, 2019 issued in corresponding Russian Application No. 2019103539.
Russian Search Report dated Oct. 16, 2019 issued in corresponding Russian Application No. 2019103525.
Russian Office Action dated Oct. 16, 2019 issued in corresponding Russian Application No. 2019103525.
Russian Search Report dated Oct. 22, 2019 issued in corresponding Russian Application No. 2019103490.
Russian Office Action dated Oct. 25, 2019 issued in corresponding Russian Application No. 2019103490.
Russian Search Report dated Jan. 13, 2020 issued in corresponding Russian Application No. 2019103486.
Russian Office Action dated Jan. 14, 2020 issued in corresponding Russian Application No. 2019103486.
Russian Search Report dated Jan. 14, 2020 issued in corresponding Russian Application No. 2019103358.
Russian Office Action dated Jan. 16, 2020 issued in corresponding Russian Application No. 2019103356.
Russian Search Report dated Feb. 6, 2020 issued in corresponding Russian Application No. 2019103349.
Russian Office Action dated Feb. 7, 2020 issued in corresponding Russian Application No. 2019103349.
Russian Search Report dated Oct. 11, 2019 issued in corresponding Russian Application No. 2019103340.
Russian Office Action dated Oct. 15, 2019 issued in corresponding Russian Application No. 2019103340.
Russian Search Report dated Oct. 16, 2019 issued in corresponding Russian Application No. 2019103328.
Russian Office Action dated Oct. 17, 2019 issued in corresponding Russian Application No. 2019103328.
Russian Search Report dated Oct. 7, 2019 issued in corresponding Russian Application No. 2019103276.
Russian Office Action dated Oct. 8, 2019 issued in corresponding Russian Application No. 2019103276.
Russian Office Action dated Jan. 30, 2018 issued in corresponding Russian Application No. 2015155037.
International Search Report dated Oct. 10, 2014 issued in corresponding International patent application No. PCT/CN2014/000639.

* cited by examiner

METHOD, DEVICE AND WEARABLE PART EMBEDDED WITH SENSE CORE ENGINE UTILIZING BARCODE IMAGES FOR IMPLEMENTING COMMUNICATION

CROSS-REFERENCE TO RELATED APPLICATIONS

This application is a continuation of U.S. patent application Ser. No. 17/197,716, filed Mar. 10, 2021, which is a continuation of U.S. patent application Ser. No. 14/901,988, filed Dec. 29, 2015, now U.S. Pat. No. 10,992,783, which is a U.S. national stage entry under 35 U.S.C. § 371 of PCT International Patent Application No. PCT/CN2014/000639, filed Jul. 3, 2014, which claims priority to Chinese Patent Application No. 201310284352.X, filed Jul. 8, 2013, the contents of which are incorporated herein by reference in their entirety.

FIELD OF THE INVENTION

The present invention relates to a communication method and a communication device, particularly to a method, a device and a wearable part utilizing barcode images to communicate between a mobile terminal and at least two backend servers.

BACKGROUND OF THE INVENTION

A two-dimensional code (dimensional barcode) uses a particular geometric figure and black-and-white graphics distributed in a two-dimensional direction according to certain rules to record data symbol information. Mobile phones' two-dimensional codes are applications of the two-dimensional code on mobile terminals.

Chinese patent application entitled "MOBILE TERMINAL SHOPPING METHOD AND SYSTEM THEREOF" whose Application No. is 200510033918.7 and Filing Date is 31 Mar. 2005 discloses a method and a system for implementing mobile terminal shopping by using a two-dimensional code. A mobile terminal photographs a two-dimensional code through a built-in camera and decodes the two-dimensional code, and the mobile terminal sends a payment request message to a payment subsystem and the payment subsystem completes payment.

Chinese patent entitled "METHOD FOR PROVIDING MOBILE SERVICES BY USING CODE GRAPH" whose Application No. is ZL200480005625.1 and Filing Date is 8 Mar. 2004 discloses a method and a system for providing mobile services by using a code graph, specifically a method and a system for providing content providing services, geographical information providing services, product information providing services, taxi call services, personal contact information providing services or payment services by using two-dimensional codes. A mobile terminal photographs a two-dimensional code through a built-in camera and decodes the two-dimensional code, the mobile terminal sends a service providing request message to a service provider server, the service provider server provides a service to the mobile terminal itself, or the service provider server communicates with another server, to provide a service to the mobile terminal.

In the prior art, the mobile terminal users need to manually download and install client software to photograph and decode the two-dimensional codes, and communicate with the backend server. The procedures of manual download and client software installation reduce the users' experience satisfaction.

In addition, the users must open the mobile terminal and photograph the two-dimensional codes using the camera of mobile terminal, so the mobile terminal must be hold by hands at any time.

Moreover, in the prior art including the above two patents, only one backend server is included which shall achieve the generation of two-dimensional codes, user registration of mobile terminal, decoding and verification of two-dimensional codes, as well as providing services corresponding to the two-dimensional codes, resulting in low working efficiency of the backend server.

SUMMARY OF THE INVENTION

In view of the above defects in the prior art, the first objective of the present invention is to provide a method and a device utilizing barcode images to communicate between a mobile terminal and at least two backend servers, to achieve the operation of two-dimensional codes generation, user registration of mobile terminal, decoding and verification of two-dimensional codes, as well as providing services corresponding to the two-dimensional codes, which are completed by different backend servers.

The second objective of the present invention is to provide a method and a device utilizing barcode images to communicate between at least two mobile terminals and at least two backend servers; the method and device in the present invention may secondly or multiply generate two-dimensional codes by these mobile terminals, and the backend server provides services for these mobile terminals according to the finally generated two-dimensional codes.

The third objective of the present invention is to provide a wearable part to communicate with the mobile terminal or another wearable part, and obtain service from the external backend server.

To achieve the first objective of the present invention, according to preferred embodiments of the present invention, the present invention provides a method utilizing barcode images to communicate between a mobile terminal and at least two backend servers, wherein the mobile terminal has a wireless connection with at least two backend servers by using a wireless network, and the method includes following steps: registering a user of the mobile terminal as a user of the first backend server, and the first backend server storing registration information of the user, wherein the user has a unique username; taking a picture of the barcode image by using a camera disposed in the mobile terminal; decoding the taken barcode image by using the mobile terminal to obtain coding information: the first backend server parsing the coding information to determine whether the barcode image is generated according to a preset coding rule, if the barcode image is generated according to the preset coding rule, executing subsequent steps; if the barcode image is not generated according to the preset coding rule, stopping executing the method after the mobile terminal is connected to a webpage corresponding to the coding information; the mobile terminal extracting service information corresponding to the coding information according to the coding information; the mobile terminal sending a service providing request message to the second backend server, wherein the service providing request message at least includes information that can uniquely identify the mobile terminal; and the second backend server providing a service to the mobile terminal according to content of the service providing request message.

To achieve the first objective of the present invention, according to preferred embodiments of the present invention, the present invention provides a device utilizing barcode images for implementing communication, including; a mobile terminal and at least two backend servers, the mobile terminal having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the mobile terminal and sending a registration success message to the mobile terminal; and a user registration unit, used for completing user registration, and storing user registration information to a database; a coding information parsing unit, used for parsing the coding information to determine whether the barcode image is generated according to a preset coding rule, and if the barcode image is generated according to the preset coding rule, further used for extracting corresponding service information according to the coding information; the second backend server includes: a second sending/receiving unit, used for receiving a service providing request message from the mobile terminal and providing a service to the mobile terminal; the mobile terminal includes: a camera, used for taking a picture of the barcode image; a decoder, used for decoding the taken barcode image to obtain coding information; a third sending/receiving unit, used for sending registration information to the first backend server and receiving a registration success message from the first backend server, if the barcode image is generated according to the preset coding rule, further used for sending a service providing request message to the second backend server and receiving a service from the second backend server, and if the barcode image is not generated according to the preset coding rule, further used for sending a webpage request message to a network browser and receiving a webpage corresponding to the coding information from the network browser; an input unit, used for inputting information required by the backend server; and a display unit, used for displaying information required by the backend server.

To achieve the first objective of the present invention, according to preferred embodiments of the present invention, the present invention further provides a device utilizing barcode images for implementing communication, including: a mobile terminal and at least two backend servers, the mobile terminal having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the mobile terminal and sending a registration success message to the mobile terminal; and a user registration unit, used for completing user registration, and storing user registration information to a database; the second backend server includes: a second sending/receiving unit, used for receiving a service providing request message from the mobile terminal and providing a service to the mobile terminal; the mobile terminal includes: a camera, used for taking a picture of the barcode image; a decoder, used for decoding the taken barcode image to obtain coding information; a coding information parsing unit, used for parsing the coding information to determine whether the barcode image is generated according to a preset coding rule, and if the barcode image is generated according to the preset coding rule, further used for extracting corresponding service information according to the coding information; a third sending/receiving unit, used for sending registration information to the first backend server and receiving a registration success message from the first backend server, if the barcode image is generated according to the preset coding rule, further used for sending a service providing request message to the second backend server and receiving a service from the second backend server, and if the barcode image is not generated according to the preset coding rule, further used for sending a webpage request message to a network browser and receiving a webpage corresponding to the coding information from the network browser: an input unit, used for inputting information required by the backend server; and a display unit, used for displaying information required by the backend server.

To achieve the first objective of the present invention, according to preferred embodiments of the present invention, the present invention provides a device utilizing barcode images for implementing communication, including: a wearable part, a mobile terminal and at least two backend servers, the mobile terminal having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the mobile terminal and sending a registration success message to the mobile terminal; and a user registration unit, used for completing user registration, and storing user registration information to a database; the second backend server includes: a second sending/receiving unit, used for receiving a service providing request message from the mobile terminal and providing a service to the mobile terminal; the wearable part includes: a camera, used for taking a picture of the barcode image; a third sending unit, used for sending the taken barcode image to the mobile terminal; the mobile terminal includes: a decoder, used for decoding the taken barcode image to obtain coding information; a fourth sending/receiving unit, if the barcode image is generated according to the preset coding rule, used for sending a service providing request message to the second backend server and receiving a service from the second backend server; an input unit, used for inputting information required by the backend server; and a display unit, used for displaying information required by the backend server.

To achieve the first objective of the present invention, according to preferred embodiments of the present invention, the present invention further provides a device utilizing barcode images for implementing communication, including: a first wearable part, a second wearable part and at least two backend servers, the second wearable part having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the second wearable part and sending a registration success message to the second wearable part; and a user registration unit, used for completing user registration, and storing user registration information to a database: the second backend server includes: a second sending/receiving unit, used for receiving a service providing request message from the second wearable part and providing a service to the second wearable part; the first wearable part includes: a camera, used for taking a picture of the barcode image; a third sending unit, used for sending the taken barcode image to the second wearable part; the second wearable part includes: a decoder, used for decoding the taken barcode image to obtain coding information; a fourth sending/receiving unit, if the barcode image is generated according to the preset coding rule, used for sending a service providing request message to the second backend server and receiving a service from the second backend server; an input unit, used for inputting information required by the backend server; and a display unit, used for displaying information required by the backend server.

To achieve the first objective of the present invention, according to preferred embodiments of the present invention, the present invention further provides a device utilizing barcode images for implementing communication, including: a wearable part, a mobile terminal and at least two backend servers, the mobile terminal having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the mobile terminal and sending a registration success message to the mobile terminal; and a user registration unit, used for completing user registration, and storing user registration information to a database; the second backend server includes: a second sending/receiving unit, used for receiving a service providing request message from the mobile terminal and providing a service to the mobile terminal; the wearable part includes: a camera, used for taking a picture of the barcode image; a decoder, used for decoding the taken barcode image to obtain coding information; a third sending unit, used for sending the taken barcode image to the mobile terminal; the mobile terminal includes: a fourth sending/receiving unit, if the barcode image is generated according to the preset coding rule, used for sending a service providing request message to the second backend server and receiving a service from the second backend server; an input unit, used for inputting information required by the backend server; and a display unit, used for displaying information required by the backend server.

To achieve the first objective of the present invention, according to preferred embodiments of the present invention, the present invention provides a device utilizing barcode images for implementing communication, including: a first wearable part, a second wearable part and at least two backend servers, the second wearable part having a wireless connection with at least two backend servers by using a wireless network, wherein the first backend server includes: a barcode image generating unit, used for generating coding information corresponding to service information and generating a barcode image corresponding to the coding information; a first sending/receiving unit, used for receiving registration information from the second wearable part and sending a registration success message to the second wearable part; and a user registration unit, used for completing user registration, and storing user registration information to a database; the second backend server includes: a second sending/receiving unit, used for receiving a service providing request message from the second wearable part and providing a service to the second wearable part; the first wearable part includes: a camera, used for taking a picture of the barcode image, a decoder, used for decoding the taken barcode image to obtain coding information; a third sending unit, used for sending the taken barcode image to the second wearable part; the second wearable part includes: a fourth sending/receiving unit, if the barcode image is generated according to the preset coding rule, used for sending a service providing request message to the second backend server and receiving a service from the second backend server; an input unit, used for inputting information required by the backend server; and a display unit, used for displaying information required by the backend server.

To achieve the second objective of the present invention, according to preferred embodiments of the present invention, the present invention provides a method utilizing barcode images to communicate between at least two mobile terminals and at least two backend servers, wherein at least two mobile terminals have a wireless connection with at least two backend servers by using a wireless network; registering a user of at least two mobile terminals as a user of the first backend server, and the first backend server storing registration information of the user, wherein the user has a unique username; the method including: generating the coding information corresponding to the service information according the preset coding rule, and generating the first barcode image and/or the first hyperlink corresponding to the coding information; the first mobile terminal combining the coding information with the coding information corresponding to the user information of the first mobile terminal, to generate the second barcode image and/or the second hyperlink, wherein the user information at least includes information that can uniquely identify the first mobile terminal; publishing the second barcode image and/or the second hyperlink on at least one region that users of other mobile terminals can contact; the second mobile terminal extracting the service information corresponding to the second barcode image and/or the second hyperlink; the second mobile terminal sending service providing request message to the second backend server, wherein the service providing request message at least includes the information that can uniquely identify the second mobile terminal; the second backend server providing service to the first mobile terminal and the second mobile terminal according to the contents of service providing request message.

To achieve the third objective of the present invention, according to preferred embodiments of the present invention, the present invention provides a wearable part to communicate with the mobile terminal; the wearable part includes: a camera, used for taking a picture of the barcode image; a first sending unit, used for sending the taken barcode image to the mobile terminal; the mobile terminal includes: a decoder, used for decoding the taken barcode image to obtain coding information; a second sending/receiving unit, if the barcode image is generated according to the preset coding rule, used for sending a service providing request message to external backend server and receiving a service from the backend server.

To achieve the third objective of the present invention, according to preferred embodiments of the present invention, the present invention provides a wearable part to communicate with the mobile terminal; the wearable part includes: a camera, used for taking a picture of the barcode image; a first sending unit, used for sending the taken barcode image to the mobile terminal; a decoder, used for decoding the taken barcode image to obtain coding information; the mobile terminal includes: a second sending/receiving unit, if the barcode image is generated according to the preset coding rule, used for sending a service providing request message to external backend server and receiving a service from the backend server.

To achieve the third objective of the present invention, according to preferred embodiments of the present invention, the present invention provides a wearable part, which is to communicate with another wearable part; the wearable part includes: a camera, used for taking a picture of the barcode image; a first sending unit, used for sending the taken barcode image to another wearable part; another wearable part includes: a decoder, used for decoding the taken barcode image to obtain coding information; a second sending/receiving unit, if the barcode image is generated according to the preset coding rule, used for sending a service providing request message to external backend server and receiving a service from the backend server.

To achieve the third objective of the present invention, according to preferred embodiments of the present invention, the present invention provides a wearable part, which is to communicate with another wearable pan; the wearable part includes: a camera, used for taking a picture of the barcode image; a first sending unit, used for sending the taken barcode image to another wearable part; a decoder, used for decoding the taken barcode image to obtain coding information; another wearable part includes: a second sending/receiving unit, if the barcode image is generated according to the preset coding rule, used for sending a service providing request message to external backend server and receiving a service from the backend server.

The communication methods and devices thereof of the present invention have the following beneficial effects:

The communication methods and devices thereof according to preferred embodiments of the present invention enable one backend server to achieve operations of two-dimensional code generation, mobile terminal user registration, two-dimensional code decoding and verification, while providing the operation of service which is corresponding to two-dimensional code is finished by another backend server or several backend servers so that to achieve the specific coordination and cooperation of several backend servers. In the some practical application, the operation of two-dimensional code generation, mobile terminal user registration, two-dimensional code decoding and verification can be finished by one backend server, and the order generation is completed by another backend server, and the payment is completed by the third backend server. Thus, it could achieve the coordination and cooperation of several backend servers, promote the cooperation among enterprises and facilitate the resources integration.

The communication methods and devices thereof according to preferred embodiments of the present invention add user information of mobile terminal, and then different mobile terminals secondly or multiply generate new barcode images based on previous barcode images. The backend server provides corresponding services for these mobile terminals according to the finally generated two-dimensional codes.

The devices thereof according to preferred embodiments of the present invention are built in the mobile terminal hardware, which could take a picture of two-dimensional code and decode even though mobile terminal does not install the client software to communicate with the backend server. In addition, if the mobile terminal installs client software, it can directly take a picture of two-dimensional code and decode without opening client software.

The backend servers of the devices thereof according to preferred embodiments of the present invention include the client software monitoring unit and client software installation unit. It determines whether to involve the client software installation unit according to the monitoring results of client software monitoring unit. If client software is not installed, the backend server will provide automatic downloading and installation services for the mobile terminal to input parameter information in the barcode images without manual operation of mobile terminal user, thus improving the experience satisfaction of the users.

The wearable parts thereof according to preferred embodiments of the present invention, such as glasses, and with which built-in a camera, could real-time achieve barcode image photographing function after the user wears the glasses, without always holding the mobile terminal to enable photograph action, significantly improving the user convenience.

Further, the mobile terminal could be replaced by a watch and other wearable parts which further increases the user options and improves the convenience.

The concept, specific structure and technical effects generated of the present invention are further described below with reference to the accompanying drawings, so as to facilitate full understanding of the objectives, features and effects of the present invention.

PREFERRED EMBODIMENTS OF THE PRESENT INVENTION

In the present invention, the barcode image may be a one-dimensional code, a two-dimensional code or a multi-dimensional code, or optical lattice diagrams (constituted by light and dark light, ultraviolet light or infrared ray) unrecognizable or difficultly to be identified by naked eyes, as long as coding information corresponding to information related to services could be completely stored. Although the storage amount of the one-dimensional code information is limited, it is also feasible in theory. We take the two-dimensional code as an example below, to describe in detail the method, the mobile terminal and the device of the present invention.

Figure 1:
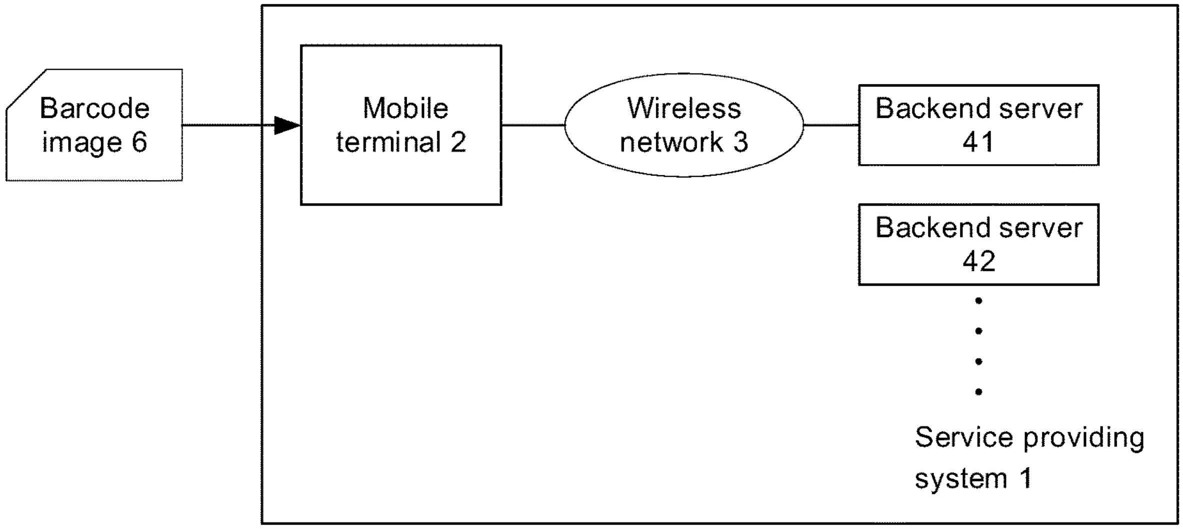
FIG. 1 is a structural block diagram of a first embodiment of a service providing system according to the present invention.

FIG. 1 shows a device utilizing barcode images for implementing communication of the present invention, that is, FIG. 1 is a structural block diagram of a first embodiment of a service providing system 1. As shown in FIG. 1, the service providing system 1 includes a mobile terminal 2, a wireless network 3 and at least two backend servers 41, 42 . . . . The mobile terminal 2 has a wireless connection with backend servers 41, 42 . . . by using the wireless network 3. Backend servers 41, 42 . . . communicate with each other through a wireless network or a wired network. The connection between/among the backend servers 41, 42 . . . preferably selects a wireless network. The wireless network may be a network such as a GPRS network, a 3G network, a 4G network, a WIFI network, or a Bluetooth network that can make the mobile terminal 2 communicate with the backend servers 41, 42 . . . at any time in a place where there is a network signal. The mobile terminal 2 takes a picture of a barcode image 6 through a built-in camera, decodes the taken barcode image 6, and requests service providing from one of the backend servers 41, 42 . . . according to information obtained through decoding. According to a service type, one of the backend servers 41, 42 . . . may provide a service to the mobile terminal 2 alone, or two or more of the backend servers 41, 42 . . . may cooperate to provide a service to the mobile terminal 2.

As a preferred embodiment of the present invention, the mobile terminal 2 only needs to be a camera-equipped mobile terminal. The mobile terminal 2 can obtain client software through downloading, a storage card or other manners, and communicates with the backend servers 41, 42 . . . through the client software upon completion of installation. The mobile terminal 2 may be a camera-equipped mobile phone, a personal digital assistant (PDA), tablet PC and so on.

Figure 2:
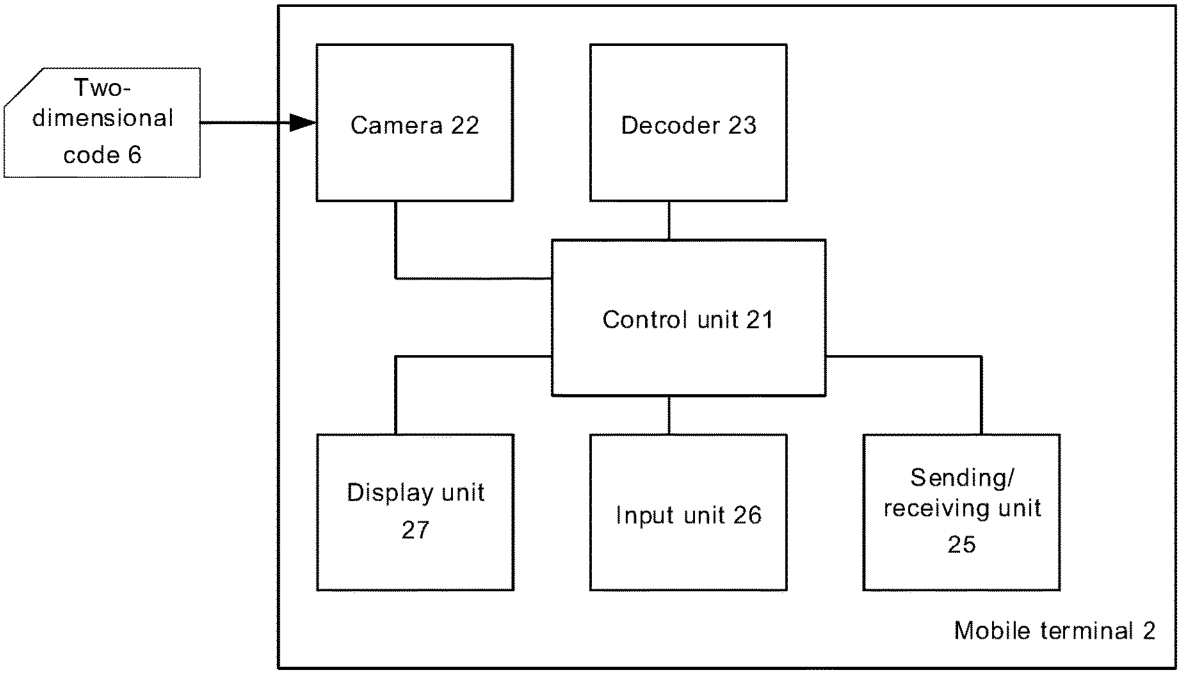
FIG. 2 is a structural block diagram of a first embodiment of the mobile terminal in FIG. 1.

FIG. 2 is a structural block diagram of a first embodiment of the mobile terminal 2 in FIG. 1. As shown in FIG. 2, the mobile terminal 2 includes a control unit 21, used for generating signals that control other units and controlling other units to achieve their respective functions. Camera 22 is used for taking a picture of a two-dimensional code 6. Cameras having more than 300,000 pixels can clearly take a picture of the two-dimensional code 6. A decoder 23 is used for decoding the taken two-dimensional code 6 to obtain coding information. A sending/receiving unit 25 is used for sending registration information to one of the backend servers 41, 42 . . . and receiving a registration success message from that backend server after registration is successful, if the two-dimensional code 6 is generated according to the preset coding rule, the sending/receiving unit 25 is further used for sending a service providing request message to the other of the backend servers 41, 42 . . . and receiving a service from that backend server; and if the two-dimensional code 6 is not generated according to the preset coding rule, the sending/receiving unit 25 is further used for sending a webpage request message to a network browser and receiving a webpage corresponding to the coding information from the network browser. An input unit 26 is used for inputting information required by the backend servers 41, 42 . . . . A display unit 27 is used for displaying information required by the backend servers 41, 42 . . . .

The input unit 26 can input registration information of the user, for example, username (that is, user ID), password, address, hobby, QQ number, payment account, and so on. A selection required by the backend servers 41, 42 . . . could also be made by the input unit 26 The input unit 26 may be a keyboard or a touch screen.

Correspondingly, the display unit 27 can display the registration information of the user, selection information and prompt information required by the backend servers 41, 42 . . . .

Figure 3:
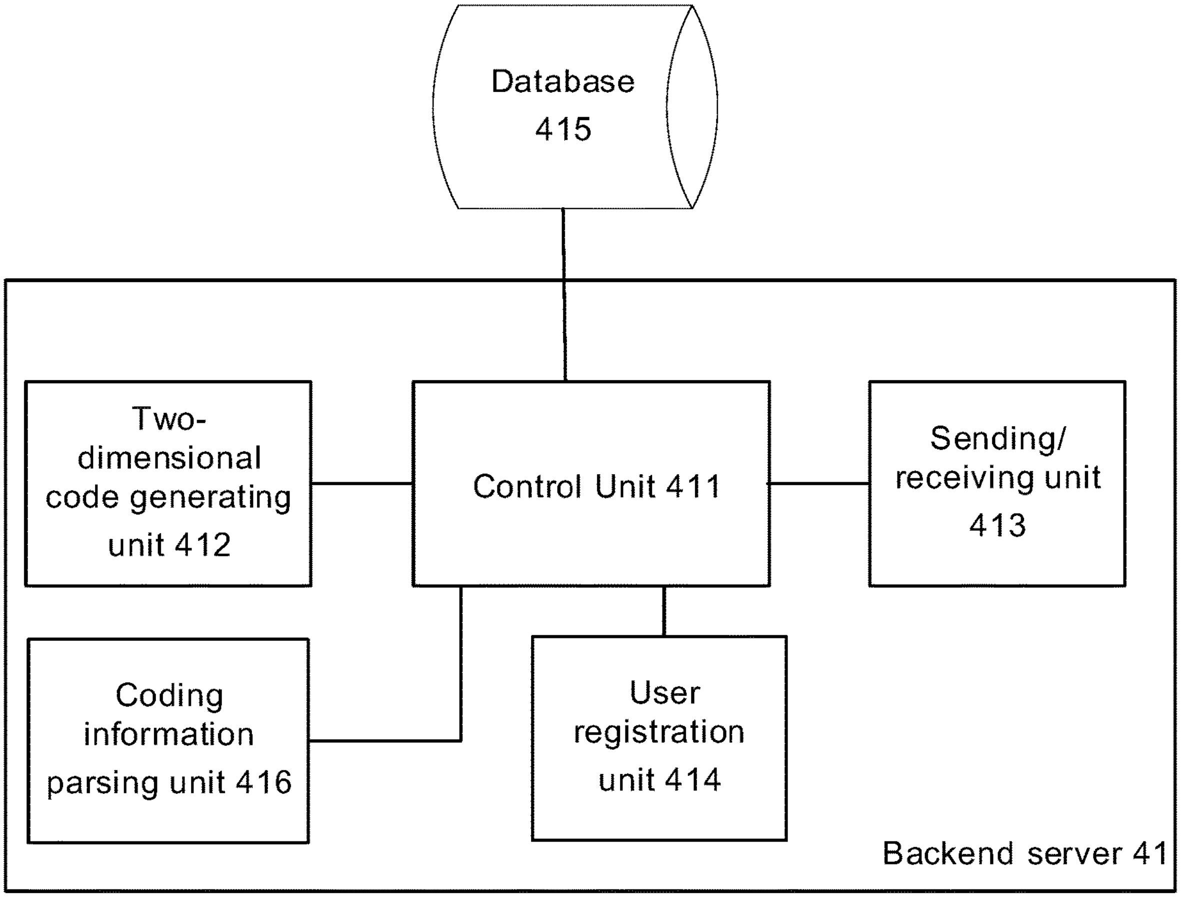
FIG. 3 is a structural block diagram of a first embodiment of the backend server in FIG. 1.

FIG. 3 is a structural block diagram of a first embodiment of the backend server 41 in FIG. 1. As shown in FIG. 3, the backend server 41 includes a control unit 411, used for generating signals that control other units and controlling other units to achieve their respective functions. A two-dimensional code generating unit 412 is used for generating coding information corresponding to service information and generating a two-dimensional code 6 corresponding to the coding information. A sending/receiving unit 413 is used for receiving a service providing request message from the mobile terminal 2 and providing a service to the mobile terminal 2, and is further used for receiving registration information from the mobile terminal 2 and sending a registration success message to the mobile terminal 2. A user registration unit 414 is used for completing user registration, and storing user registration information to an external database 415. The backend server 41 can call data in the database 415 at any time. A coding information parsing unit 416 is used for parsing the coding information to determine whether the two-dimensional code 6 is generated according to a preset coding rule, and if the two-dimensional code 6 is generated according to the preset coding rule, the coding information parsing unit 416 is further used for extracting corresponding service information according to the coding information.

The coding information parsing unit 416 parses the coding information, to distinguish the coding rule of the two-dimensional code 6. If the coding rule of the two-dimensional code 6 is correspondingly consistent with that of the backend server 41, the sending/receiving unit 25 can communicate with the backend server 41, to obtain a desired service. If the coding rule of the two-dimensional code 6 is inconsistent with that of the backend server 41, the mobile terminal 2 can automatically connect a website corresponding to the two-dimensional code 6 to browse a webpage. Certainly, the error prompt information may be displayed on the display unit 27 of the mobile terminal 2.

The two-dimensional code 6 for the mobile terminal 2 to take a picture can be generated by the two-dimensional code generating unit 412 of the backend server 41, or can also be generated by an external two-dimensional code generating device. Certainly, the coding rule of the two-dimensional code generating unit 412 is consistent with that of the external two-dimensional code generating device.

Figure 4:
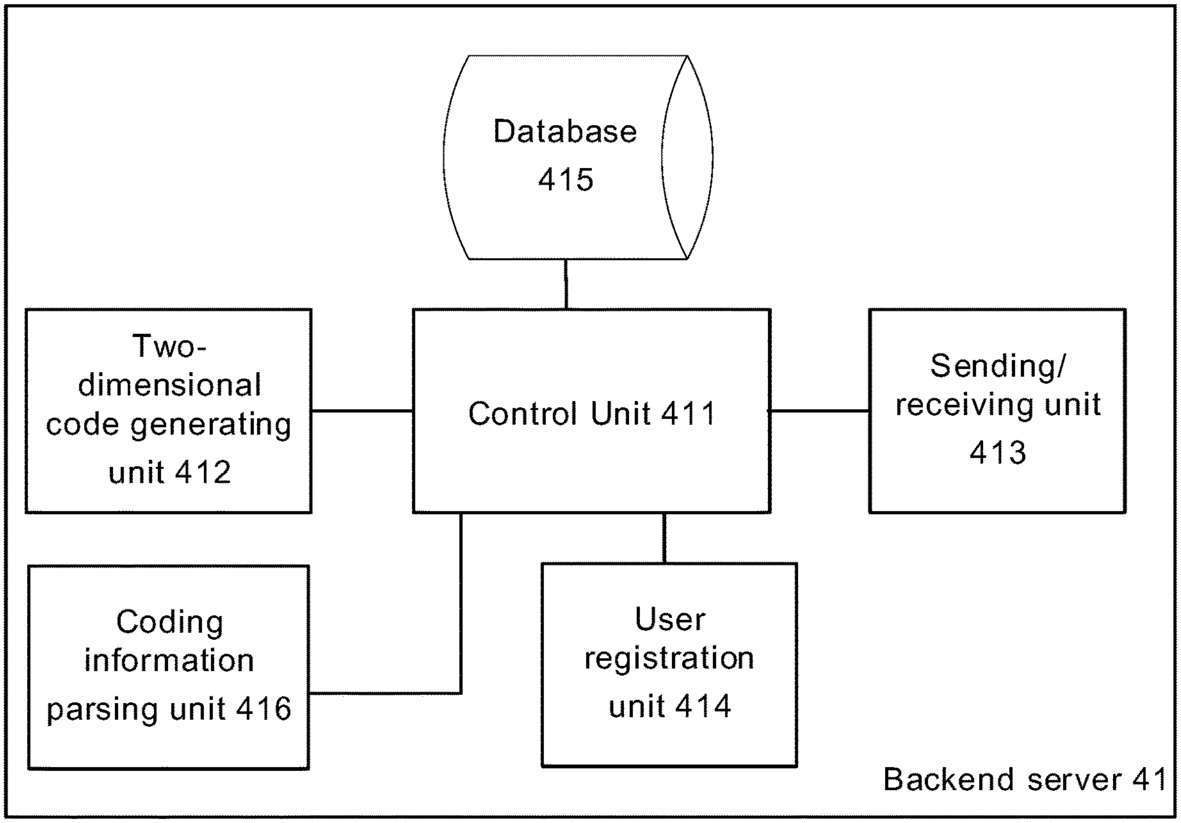
FIG. 4 is a structural block diagram of a second embodiment of the backend server in FIG. 1.

FIG. 4 is a structural block diagram of a second embodiment of the backend server 41 in FIG. 1. The difference between FIG. 4 and FIG. 3 lies in that, the database 415 in FIG. 3 is located outside the backend server 41, while the database 415 in FIG. 4 is located inside the backend server 41.

Figure 5:
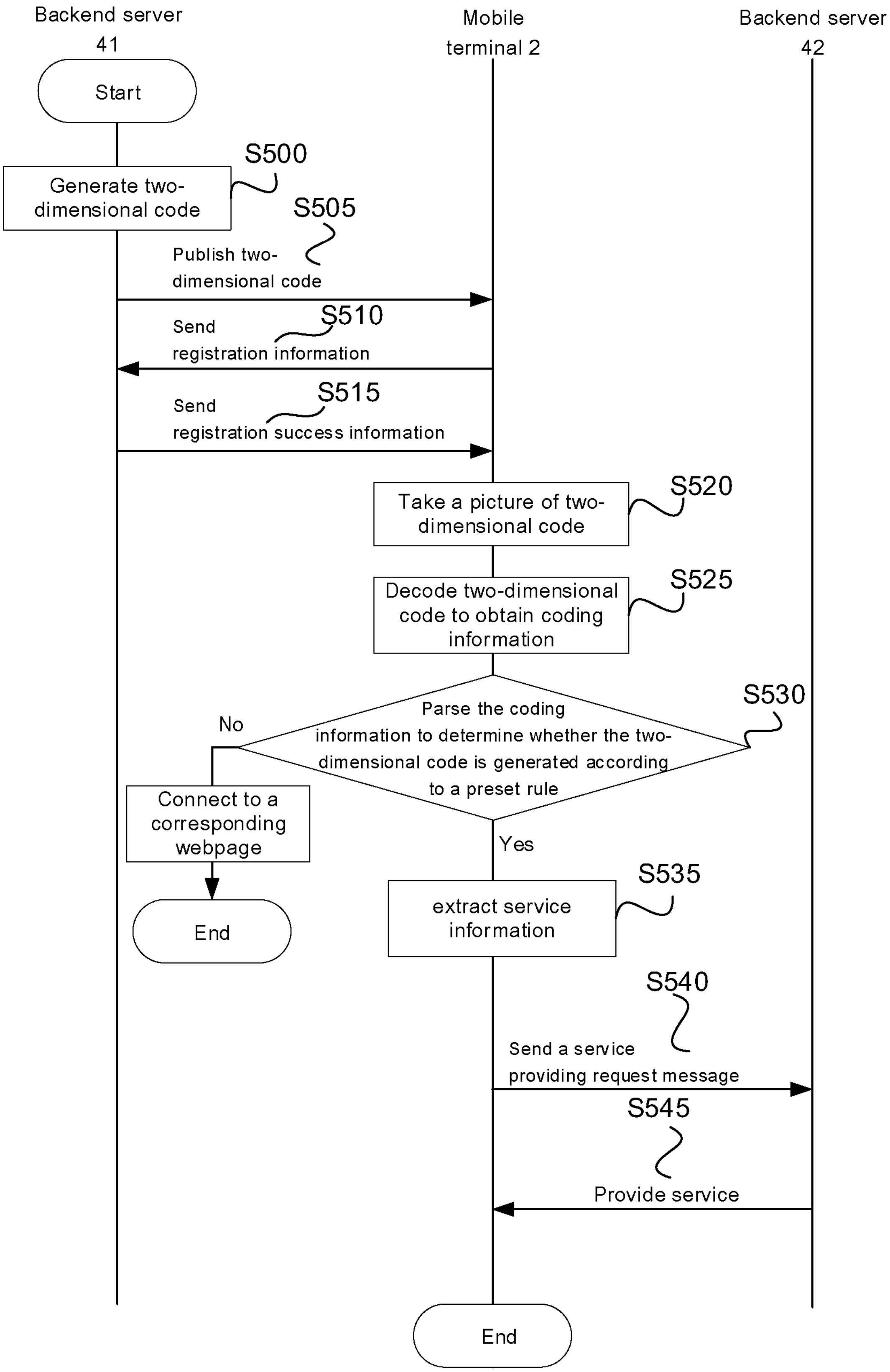
FIG. 5 is a flow chart of a first embodiment of a method utilizing barcode images to communicate between a mobile terminal and at least two backend servers according to the present invention.

FIG. 5 is a flow chart of a first embodiment of a method for implementing communication between a mobile terminal 2 and backend servers 41 and 42 by using a barcode image according to the present invention. As shown in FIG. 5, in step S500, backend service server 41 generates a two-dimensional code 6 according to a preset coding rule. According to a service provided by the backend server 42, generate corresponding coding information by using information related to the service according to a preset coding rule, and then generate a corresponding two-dimensional code 6 by using the coding information.

As another embodiment of the present invention, additional two-dimensional code generating device may be used to generate two-dimensional code 6. The coding rule of the two-dimensional code generating device is consistent with that of the backend server 41, and correspondingly matches the decoding rule of the mobile terminal 2.

In step S505, the two-dimensional code 6 is published on a place in the mobile terminal 2 that users can contact. For example, the two-dimensional code 6 can be published on a webpage of Internet or application software such as microblog, Wechat, QQ application etc., or be published on multiple information platforms such as sales catalogs, TV shopping screens, and building advertising media, poster, physical store walls, exhibition and so on.

In step S510, a user is registered as a user of the backend server 41 through the mobile terminal 2, mobile terminal 2 sends registration information to the backend server 41, and the backend server 41 stores registration information of the user.

In step S515, the backend server 41 sends registration success message to the mobile terminal 2. The registration information at least includes a unique username and password. Certainly, the registration information also may include address, hobby, QQ number, payment account and other personal information.

In step S520, take a picture of the two-dimensional code 6 by using a camera disposed in the mobile terminal 2. The camera generally has 300,000 pixels or more than 300,000 pixels, which can ensure clarity of the two-dimensional code 6. When the camera focuses on the two-dimensional code 6 and the two-dimensional code 6 is clear enough on the viewfinder screen, the camera automatically takes a picture of the two-dimensional code 6.

In step S525, the mobile terminal 2 decodes the taken two-dimensional code 6 to obtain coding information corresponding to service information.

In step S530, the mobile terminal 2 parses the coding information to determine whether the two-dimensional code 6 is generated according to a preset coding rule, that is, to determine whether the two-dimensional code 6 is generated by the backend server 41 or other device. If the two-dimensional code 6 is generated by the backend server 41, the mobile terminal 2 can request obtaining the service provided by the backend server 42. If the two-dimensional code 6 is not generated by the backend server 41, the mobile terminal 2 sends a webpage request message to a network browser, and the network browser sends a corresponding webpage to the mobile terminal 2, and displays it on a screen of the mobile terminal 2. If the two-dimensional code 6 is not generated by the backend server 41, the method of this specific embodiment is no longer executed after connecting to the corresponding webpage.

As another embodiment of the present invention, if the two-dimensional code 6 is not generated by the backend server 41, the method of this specific embodiment is no longer executed after displaying the error prompt information.

In step S535, the coding information is parsed, the mobile terminal 2 extracts the stored service information from the backend server 42, and displays the information related to the service on the display screen of the mobile terminal 2, for the user to view.

In step S540, the mobile terminal 2 sends a service providing request message to the backend server 42, to request the backend server 42 to provide a service. The service providing request message at least includes information that can uniquely identify the mobile terminal 2. The information that can uniquely identify the mobile terminal 2 includes one or more of a telephone number of the mobile terminal 2, an IMEI number of the mobile terminal 2, a username and a physical address of an interface of the mobile terminal 2. The telephone number of the mobile terminal 2, the IMEI number of the mobile terminal 2, the username and the physical address of an interface of the mobile terminal 2 can serve as a unique user identifier, so that the backend server 42 can correctly identify the mobile terminal 2. Certainly, the service providing request message also may include other information that the backend server 42 considers necessary.

In step S545, the backend server 42 provides a service to the mobile terminal 2 according to content of the service providing request message.

As another embodiment of the present invention, the user of mobile terminal 2 may also rapidly register as the user of the backend server 41 without sending registration information. For example, the backend server may identify the mobile terminal 2 by the unique IMEI number, SIM card number of mobile terminal 2 or physical address of an interface of the mobile terminal 2. Certainly, the backend server 41 is related to the mobile terminal 2.

Figure 6:
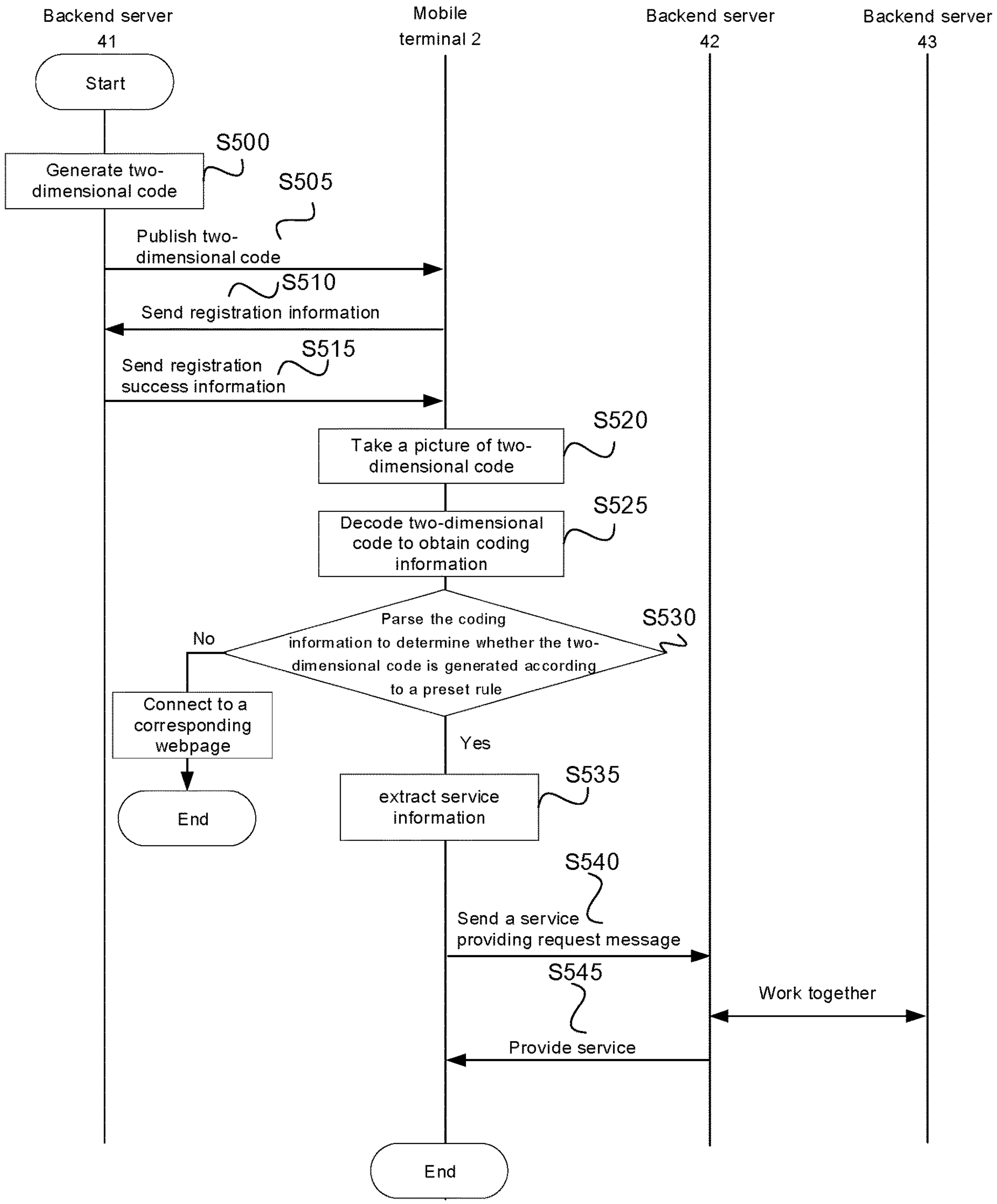
FIG. 6 is a flow chart of a second embodiment of a method utilizing barcode images to communicate between a mobile terminal and at least two backend servers according to the present invention.

FIG. 6 is a flow chart of a second embodiment of the method for implementing communication between a mobile terminal 2 and backend servers 41, 42 and 43 by using a barcode image according to the present invention. The difference between FIG. 6 and FIG. 5 lies in that, in FIG. 5, the backend server 42 provides service to the mobile terminal 2 independently, while in FIG. 6, the backend server 42 shall provide service to the mobile terminal 2 together with another backend server 43. Whether it is necessary to use other backend server is determined by the service type. For example, if it is a payment service, backend server 43 is required to complete payment. If it is the content providing service, the backend server 42 can complete the content providing service alone only if it has sufficient content information.

In the preferred embodiment of the present invention, the quantity of the backend servers may be two, three or more. The quantity of the backend servers is determined by the complexity of the provided service. In the embodiments of the present invention, the generation of two-dimensional code 6, user registration of mobile terminal 2 and other operations are completed by one backend server 41, while the operations providing service corresponding to two-dimensional code 6 is independently completed by the backend server 42, or cooperated together with the backend servers 42 and 43.

The following takes the commodity purchase and payment as the example, to detail the method of communication between the mobile terminal 2 and backend servers 41, 42 and 43 by using a barcode image according to the present invention.

Figure 7:
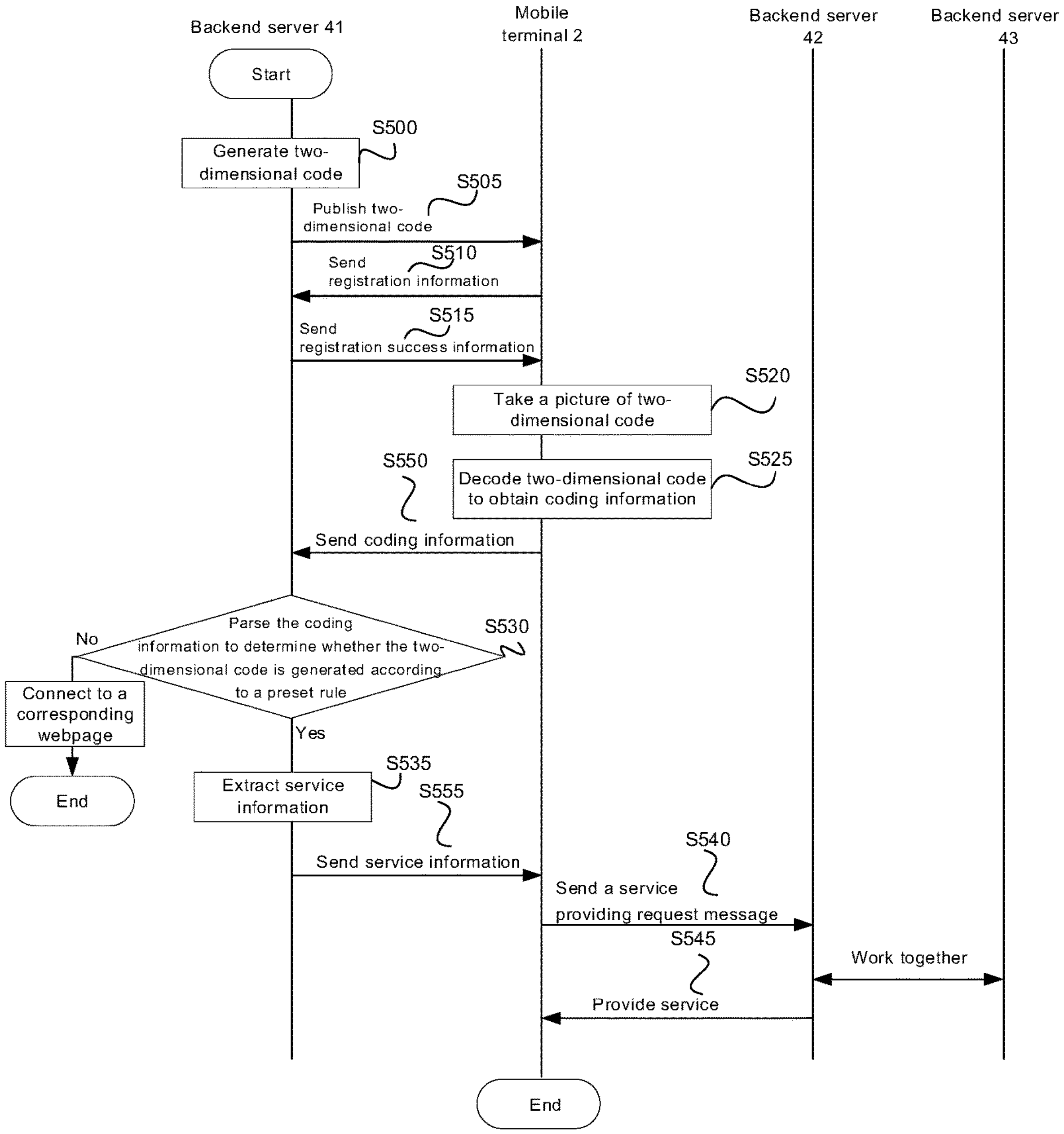
FIG. 7 is a flow chart of a third embodiment of a method utilizing barcode images to communicate between a mobile terminal and at least two backend servers according to the present invention.

FIG. 7 is a flow chart of a third embodiment of the method for implementing communication between a mobile terminal 2 and backend servers 41, 42 and 43 by using a barcode image according to the present invention.

The difference between FIG. 7 and FIG. 6 lies in that, the parsing verification of two-dimensional code 6 in step S530 and extracting of service information in step S535 are executed in the backend server 41. After the mobile terminal 2 decodes two-dimensional code 6 to obtain the coding information (step S525), the coding information is sent to the backend server 41 through step S550. The backend server 41 parses coding information to determine whether two-dimensional code 6 is generated according to the preset coding rule, that is, to determine whether two-dimensional code 6 is generated by the backend server 41 or other devices. If two-dimensional code 6 is generated by the backend server 41, the mobile terminal 2 may request obtaining the service provided by the backend server 42. If two-dimensional code 6 is not generated by the backend server 41, the mobile terminal 2 sends a webpage request message to a network browser, and the network browser sends a corresponding webpage to the mobile terminal 2, and displays it on a screen of the mobile terminal 2. If the two-dimensional code 6 is not generated by the backend server 41, the method of this specific embodiment is no longer executed after connecting to the corresponding webpage.

In addition, after the backend server 41 extracts the service information (step S535), in the step S555, the service information is sent to the mobile terminal 2. Mobile terminal 2 will execute the next service providing request operation.

In this specific embodiment, the verification of two-dimensional code 6 is implemented in the backend server 41. The verification of two-dimensional code 6 may be implemented in the mobile terminal 2 or in the backend server 41.

Figure 8:
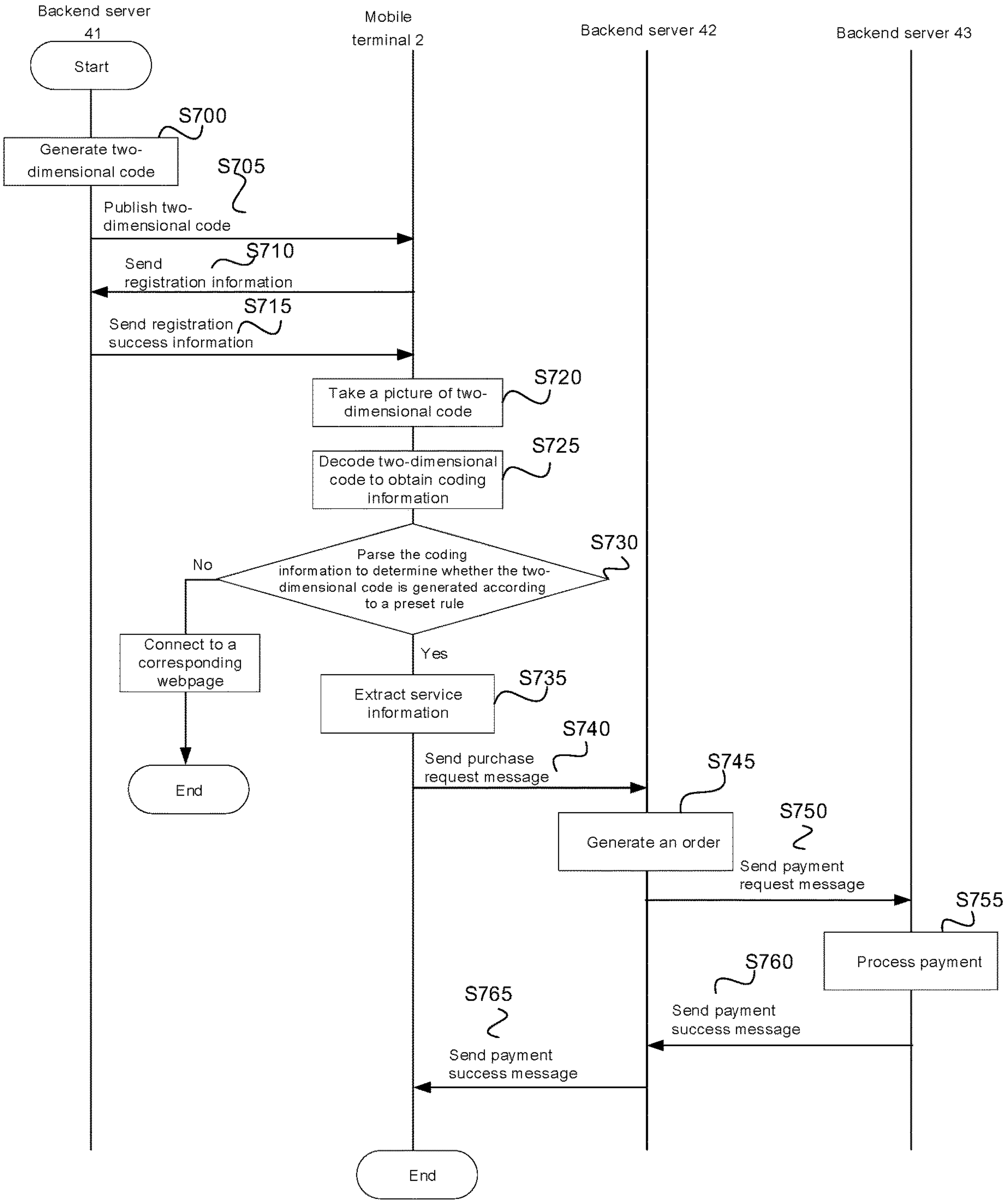
FIG. 8 is a flow chart of a fourth embodiment of a method utilizing barcode images to communicate between a mobile terminal and at least two backend servers according to the present invention.

FIG. 8 is a flow chart of a fourth embodiment of the method for implementing communication between a mobile terminal 2 and backend servers 41, 42 and 43 by using a barcode image according to the present invention.

In step S700, the backend server 41 encodes commodity information of a commodity, generates a two-dimensional code corresponding to the commodity information, and stores the commodity information into a database 415. The commodity information may include commodity code, commodity grouping, Regional GIS classification information, transaction price, sales organization, distribution channel, payment manner, receiving bank account number, third-party shroff account number and other commodity-related information.

In step S705, publish the two-dimensional code 6 of the commodity on various information platforms.

In step S710, the user is registered a user of the backend server 41 through the mobile terminal 2, mobile terminal sends registration information to the backend server 41, and the backend server 41 stores registration information of the user.

In step S715, the backend server 41 sends registration success message to the mobile terminal 2. The registration information at least includes a unique username and password. Certainly, the registration information also may include address, hobby, QQ number, payment account and other personal information.

In step S720, take a picture of the two-dimensional code of the commodity by using a camera disposed in the mobile terminal 2.

In step S725, decode the taken two-dimensional code to obtain coding information corresponding to the commodity information.

In step S730, parse the coding information to determine whether the two-dimensional code 6 is generated according to a preset coding rule, that is, to determine whether the two-dimensional code is generated by the backend server 41 or other device. If the two-dimensional code 6 is generated by the backend server 41, the mobile terminal 2 can request obtaining a service provided by the backend server 41. If the two-dimensional code 6 is not generated by the backend server 41, that is, the two-dimensional code 6 is a commodity of other business, execution of the method is ended after the mobile terminal 2 is connected to a webpage corresponding to the commodity.

In step S735, extract the commodity information from the backend server 42 according to the coding information, and display the commodity information on the mobile terminal 2, for the user to view.

In step S740, if the user is satisfied with the commodity, the user sends a purchase request message to the backend server 42 through the mobile terminal 2. The purchase request message includes one or more of a telephone number of the mobile terminal 2, an IMEI number of the mobile terminal 2, a username and a physical address of an interface of the mobile terminal 2, and may further include other user information. The purchase request message further includes transaction information, such as purchase quantity, payment manner and so on.

In step S745, the backend server 42 generates an order.

In step S750, the backend server 42 sends a payment request message to the backend server 43. The backend server 43 can be a payment server of a bank, a payment server of a mobile operator, a payment server of paypal, or the like.

In step S755, the backend server 43 disposes payments, and completes payment for the commodity.

In step S760, the backend server 43 sends a payment success message to the backend server 42.

In step S765, the backend server 42 sends a payment success message to the mobile terminal 2, and displays the message on a display screen of the mobile terminal 2, to notify the user.

In this embodiment, the backend server 42 also may communicate with a server of a logistics corporation, to notify a delivery address. The backend server 42 also may communicate with a business, to notify success of commodity purchase and payment. The backend server 42 also may calculate the sales commission, for example, releasing the commission of information platforms of two-dimensional code 6.

The method in this embodiment can provide a safe payment method. Since the two-dimensional code 6, the mobile terminal 2 and the backend server 41 all contain a preset coding rule, and thus a risk of leaking payment account may not happen as long as three parties are not infected by the same virus at the same time. In addition, in the method of this embodiment, it is only necessary to submit registration information to the backend server 41, and shopping can be done through two-dimensional code 6 on various information platforms. Thus, the risk can be evaded by avoiding repeatedly submitting personal information (especially payment information) to each shopping site.

Due to the wide distribution range of the two-dimensional code 6 and mobile flexibility of the mobile terminal 2, users can make purchase and payment conveniently anytime anywhere. The method in this embodiment may definitely achieve a great commercial success.

Figure 9:
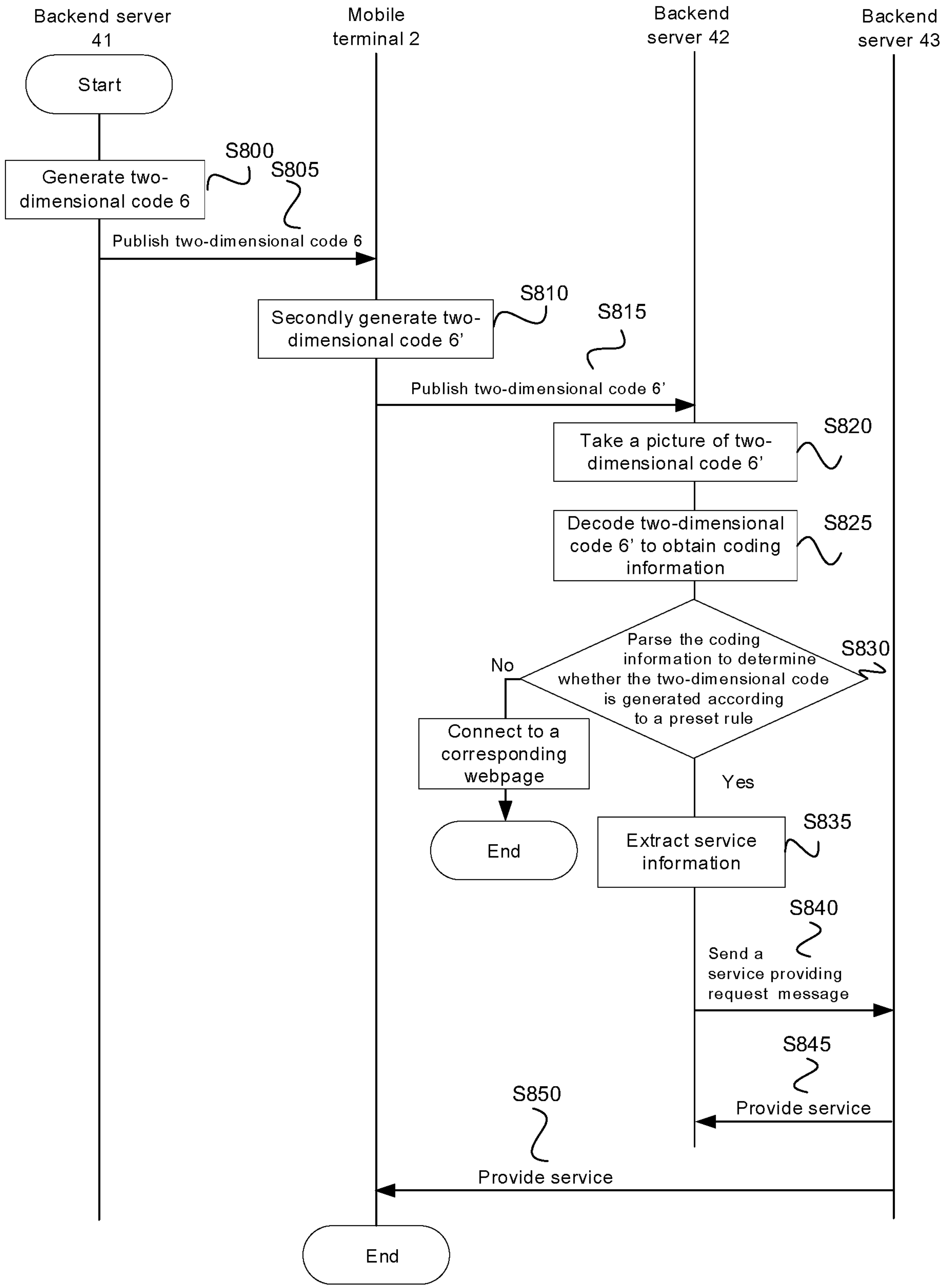
FIG. 9 is a flow chart of a fifth embodiment of a method utilizing barcode images to communicate between at least two mobile terminals and at least two backend servers according to the present invention.

FIG. 9 is a flow chart of a fifth embodiment of the method for implementing communication between mobile terminals 2, 2' and backend servers 41 and 42 by using a barcode image according to the present invention.

In step S800, the backend server 41 encodes the service information according to the present coding rule and generates a two-dimensional code 6 corresponding to the service information.

In step S805, publish the two-dimensional code 6 on various information platforms.

In step S810, the mobile terminal 2 combines the coding information of two-dimensional code 6 with the coding information of the user information corresponding to mobile terminal 2, and secondly generates two-dimensional code 6'.

In step S815, publish the two-dimensional code 6' on various information platforms.

In step S820, take a picture of the two-dimensional code 6' by using a camera disposed in the mobile terminal 2'.

In step S825, decode the taken two-dimensional code 6' to obtain coding information corresponding to the service information.

In step S830, parse the coding information to determine whether the two-dimensional code 6' is generated according to a preset coding rule, that is, to determine whether the two-dimensional code is generated by the backend server 41 or other device. If the two-dimensional code 6' is generated by the backend server 41, the mobile terminal 2' can request obtaining a service provided by the backend server 41. If the two-dimensional code 6' is not generated by the backend server 41, that is, the two-dimensional code 6' is a commodity of other businesses, and execution of the method is ended after the mobile terminal 2' is connected to a webpage corresponding to the commodity.

In step S835, extract the service information from the backend server 42 according to the coding information.

In step S840, send the service providing request message to the backend server 42 through the mobile terminal 2'. The service providing request message includes one or more of a telephone number of the mobile terminal 2', an IMEI number of the mobile terminal 2', a username and a physical address of an interface of the mobile terminal 2'.

Certainly, as another preferred embodiment of the present invention, the two-dimensional code 6' contains the user information of mobile terminal 2, the service providing request message may further include one or more of a telephone number of the mobile terminal 2, an IMEI number of the mobile terminal 2, a username and a physical address of an interface of the mobile terminal 2.

In step S845, the backend server 42 provides service for mobile terminal 2'.

In step S850, the backend server 42 provides service for mobile terminal 2.

Certainly, the embodiment method also includes the registration procedure of mobile terminals 2 and 2' in the backend server 41, and details are not further described.

Figure 10:
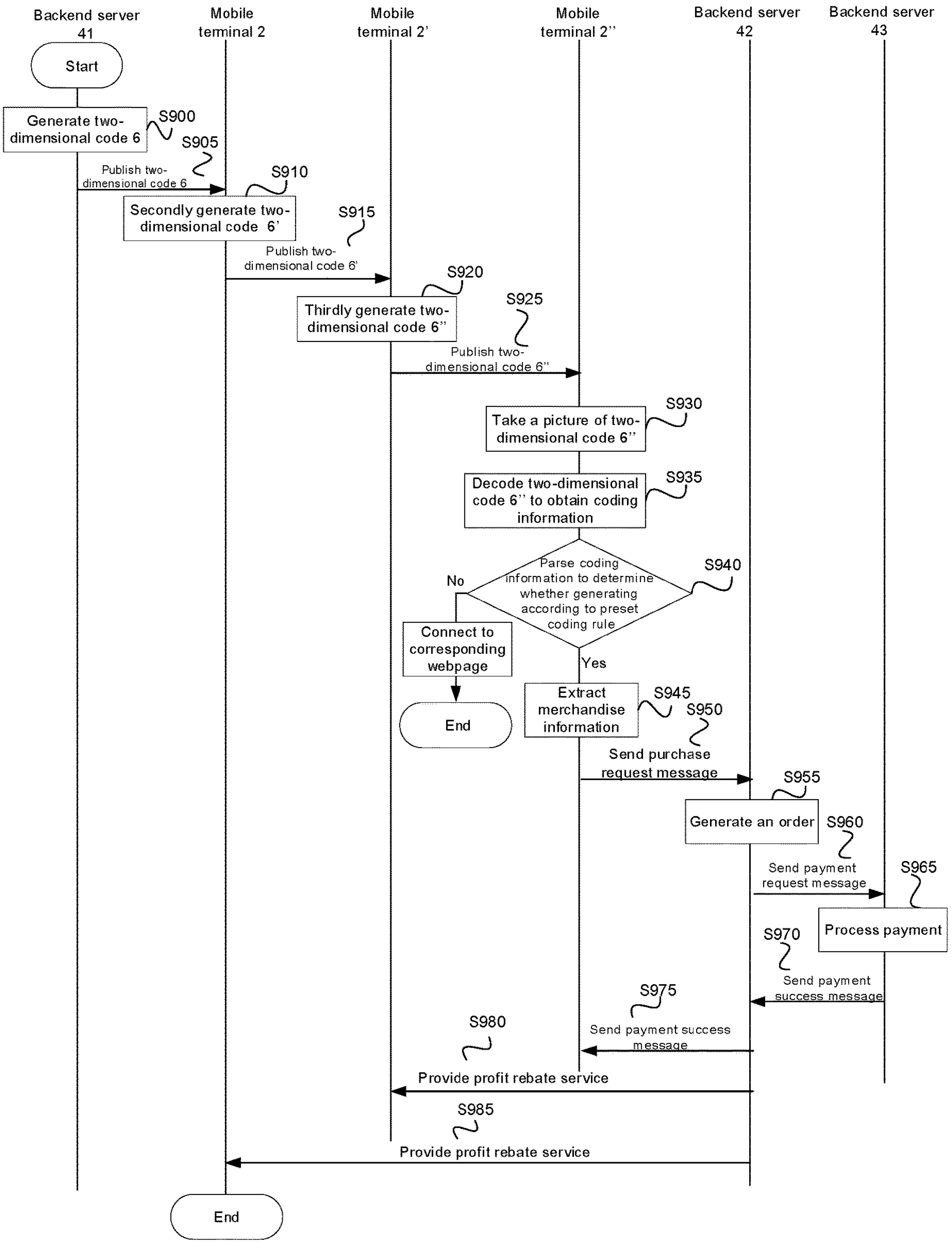
FIG. 10 is a flow chart of a sixth embodiment of a method utilizing barcode images to communicate between at least two mobile terminals and at least two backend servers according to the present invention.

FIG. 10 is a flow chart of a sixth embodiment of the method for implementing communication between mobile terminals 2, 2', 2" and backend servers 41, 42 and 43 by using a barcode image according to the present invention. In this embodiment, based on two-dimensional code 6 containing commodity information, the mobile terminals 2 and 2' generate two-dimensional codes 6' and 6" secondly and thirdly, and publish two-dimensional codes 6' and 6". When the user at mobile terminal 2" takes a picture of two-dimensional code 6" and purchases the commodity, the business will issue profit rebate to user of mobile terminals 2 and 2' according to the publishing behavior of mobile terminals 2 and 2.

In step S900, the backend server 41 encodes commodity information according to the preset coding rule and generates a two-dimensional code 6 corresponding to the commodity information.

In step S905, publish the two-dimensional code 6 on various information platforms.

In step S910, the mobile terminal 2 combines the coding information of two-dimensional code 6 with the coding information of the user information corresponding to mobile terminal 2, and secondly generates two-dimensional code 6'.

In step S915, publish the two-dimensional code 6' on various information platforms.

In step S920, the mobile terminal 2' combines the coding information of two-dimensional code 6' with the coding information of the user information corresponding to mobile terminal 2', and thirdly generates two-dimensional code 6".

In step S925, publish the two-dimensional code 6" on various information platforms.

In step S930, take a picture of the two-dimensional code 6" by using a camera disposed in the mobile terminal 2".

In step S935, decode the taken two-dimensional code 6" to obtain coding information corresponding to the commodity information.

In step S940, parse the coding information to determine whether the two-dimensional code 6' is generated according to a preset coding rule, that is, to determine whether the two-dimensional code is generated by the backend server 41 or other device. If the two-dimensional code 6" is generated by the backend server 41, the mobile terminal 2" can request obtaining a service provided by the backend server 41. If the two-dimensional code 6" is not generated by the backend server 41, that is, the two-dimensional code 6" is a commodity of other businesses, and execution of the method is ended after the mobile terminal 2" is connected to a webpage corresponding to the commodity.

In step S945, extract the service information from the backend server 42 according to the coding information and display on the display screen of mobile terminal 2" for the user to view.

In step S950, if the user is satisfied with the commodity, the user sends the purchase request message to the backend server 42 through the mobile terminal 2". The purchase request message includes one or more of a telephone number of the mobile terminal 2", an IMEI number of the mobile terminal 2", a username and a physical address of an interface of the mobile terminal 2", and may also include other user information. The purchase request message also includes the transaction information, such as the purchase quantity, payment method, and so on.

In step S955, the backend server 42 generates an order.

In step S960, the backend server 42 sends a payment request message to the backend server 43. The backend server 43 may be a payment server of a bank, a payment server of a mobile operator, a payment server of paypal, or the like.

In step S965, the backend server 43 processes payments, and completes payment for the commodity.

In step S970, the backend server 43 sends a payment success message to the backend server 42.

In step S975, the backend server 42 sends a payment success message to the mobile terminal 2", and displays the message on a display screen of the mobile terminal 2", to notify the user.

In step S980, the backend server 42 issues profit rebate to mobile terminal 2'.

In step S985, the backend server 42 issues profit rebate to mobile terminal 2.

The finally generated two-dimensional code 6" contains the user information of mobile terminals 2 and 2'. The user of mobile terminals 2 and 2' has advertising promotion contribution to the finally generated purchase operation by the generation and publishing of two-dimensional code. The business will implement profit rebate for the re-generation and re-publishing of such two-dimensional code.

Certainly, the method of the present invention has no limitation on the quantity of mobile terminals and generation times of two-dimensional code, and the method of the present invention may involve any quantity of mobile terminals and generate new two-dimensional code at random times.

Certainly, the embodiment method also includes the registration procedure of mobile terminals 2, 2' and 2" in the backend server 41, and details are not further described.

As another embodiment of the present invention, in step S900, the backend server 41 generates two dimensional barcode 6 and the first hyperlink corresponding to the commodity information.

In Step S910, mobile terminal 2 two times generates two-dimensional code and simultaneously generates the second hyperlink which contains the same information as the information contained in the two times generated two-dimensional code. The two-dimensional code takes a picture to parse the contained commodity information and user information of mobile terminal 2, while the hyperlink needs to click and open to extract the contained commodity information and user information of mobile terminal 2.

Correspondingly, in step S920, the mobile terminal 2' three times generates two-dimensional code and simultaneously generates the third hyperlink which contains the same information as the information contained in the three times generated two-dimensional code.

Figure 11:
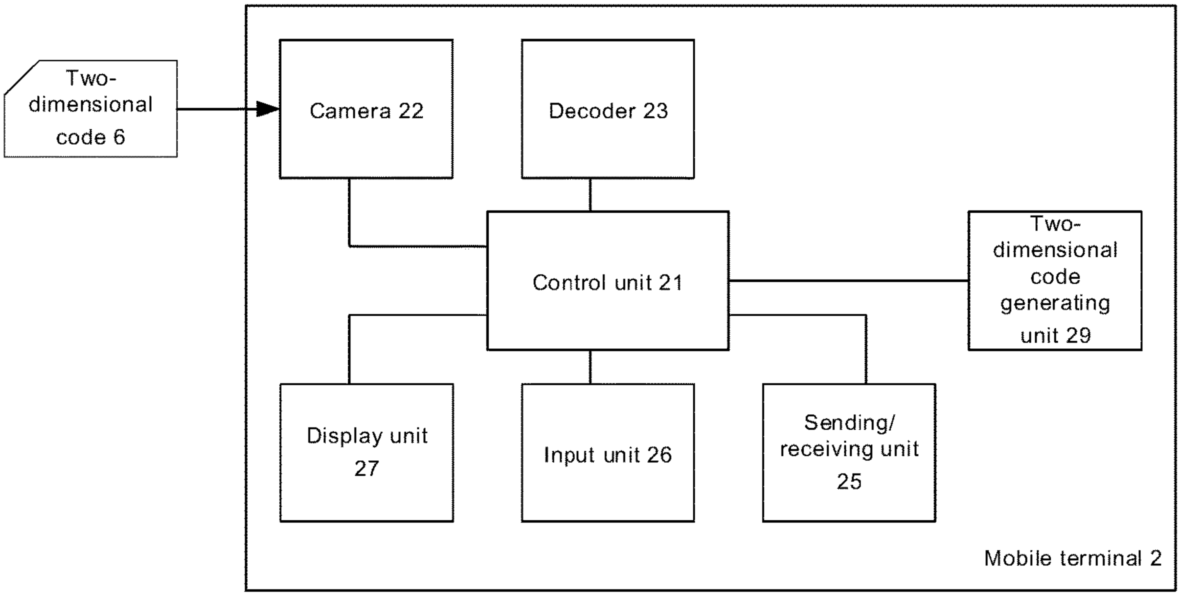
FIG. 11 is a structural block diagram of a second embodiment of the mobile terminal in FIG. 1.

Mobile terminal 2" may take a picture and parses the three times generated two-dimensional code, or open the third hyperlink to extract the commodity information contained in the two-dimensional code or hyperlink and the user information of mobile terminals 2 and 2'. For example, in microblog or Wechat, the mobile terminal 2" click and open the third hyperlink (microblog or Wechat displays on mobile terminal 2", therefore, mobile terminal 2" could not take a picture and parse the three times generated two-dimensional code). First, determine whether the mobile terminal 2" is installed with client software, if not, after downloading and installation, read the information contained in the third hyperlink; if installed, directly read the information contained in the third hyperlink. FIG. 11 is a structural block diagram of a second embodiment of the mobile terminal 2 in FIG. 1. The different between FIG. 11 and FIG. 2 is that, the mobile terminal 2 in FIG. 11 further includes a two-dimensional code generating unit 29 which is used to generate the new two-dimensional code 6'. The two-dimensional code 6 is taken a picture by the camera 22, decoded by the decoder 23 and parsed by coding information parsing unit 416, the information related to services contained in two-dimensional code 6 is extracted. Based on information related to services contained in original two-dimensional code 6, two-dimensional code generating unit 29 adds user information and generates the new coding information, and further generates the corresponding new two-dimensional code 6'. The user information at least includes one or more of a telephone number of the mobile terminal 2, an IMEI number of the mobile terminal 2, a username and a physical address of an interface of the mobile terminal 2, to uniquely identify the user of mobile terminal 2. Certainly, the user information shall also include other information related to services provided by the backend server 42. Due to high safety of two-dimensional code, the user information is contained in two-dimensional code and sent to the backend servers 41 and 42, and the user information safety can be guaranteed without encryption and decryption.

Figure 12:
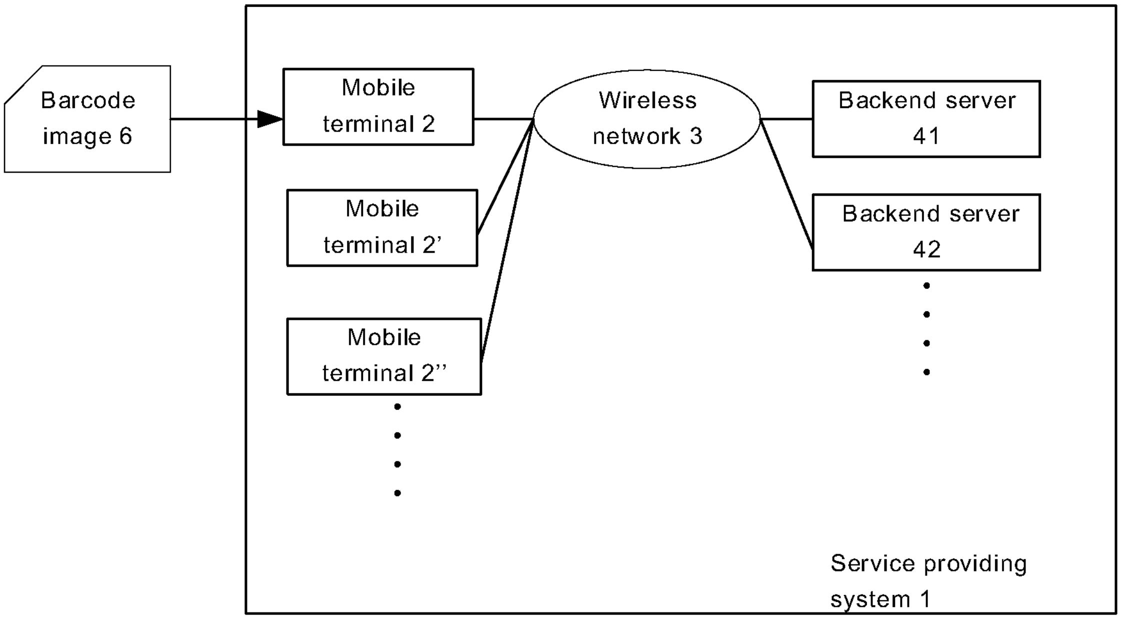
FIG. 12 is a structural block diagram of a second embodiment of the service providing system according to the present invention.

FIG. 12 is a structural block diagram of a second embodiment of the service providing system 1 according to the present invention. The difference between FIG. 12 and FIG. 1 is that, the service providing system 1 in FIG. 12 includes multiple mobile terminals 2, 2' and 2" . . . . The service providing system 1 according to the present invention has no quantity limitation on mobile terminals, which may be one or more than one. In the present invention, the service providing system 1 requires that the quantity of backend server shall be two at least.

Figure 13:
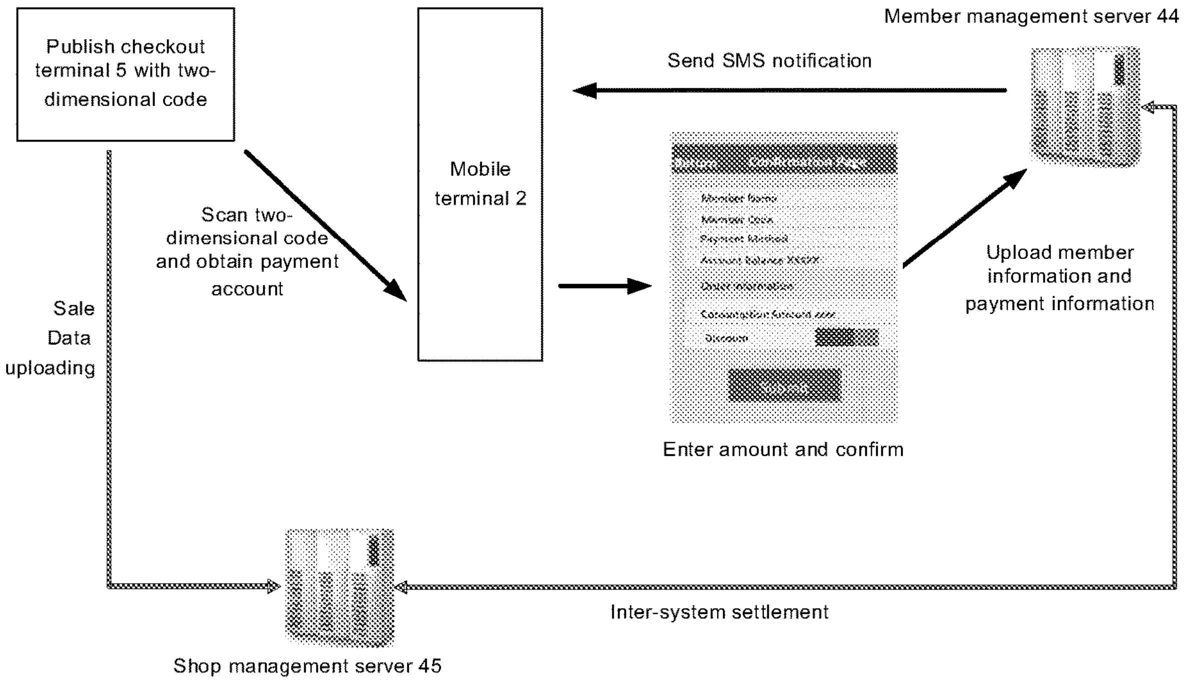
FIG. 13 is a flow chart of a seventh embodiment of a method utilizing barcode images to communicate between a mobile terminal and at least two backend servers according to the present invention.

FIG. 13 is a flow chart of a sixth embodiment of a method utilizing barcode images to communicate between the mobile terminal 2 and backend servers 41, 44 and 45 according to the present invention. In this embodiment, the checkout terminal 5 does not need POS machine but publishing two-dimensional code 6. Mobile terminal 2 registered as user of backend server 41 (not shown in the figure) has been bound with the merchant payment card. For example, the mobile terminal 2 is bound with LIANHE OK card, DESHI card or catering prepaid card. User of mobile terminal 2 just carries the mobile terminal 2 rather than carries these payment cards to finish the payment. Client software of mobile terminal 2 scans two-dimensional code 6 to obtain the payment card number bound with mobile terminal 2. Meanwhile, checkout terminal 2 uploads the sale data to the shop management server 4. Record the payment amount and confirm on client software of mobile terminal 2. Mobile terminal 2 uploads the member information and payment information to management server 44. Member management server 44 and shop management server 45 implement inter-system settlement. After the settlement, shop management server 45 sends message to mobile terminal 2 and notify the successful payment.

In this embodiment, the backend server 41 is only responsible for the generation of two-dimensional code 6, registration of mobile terminal 2 and verification of two-dimensional code 6. Member management server 44 and shop management server 45 jointly complete the payment and deduct money from the payment card. Payment service is provided by the merchant server, independent with the function of backend server 41. The configuration mode of multiple servers is more suitable for the development of current business and merchant benefits.

Figure 14:
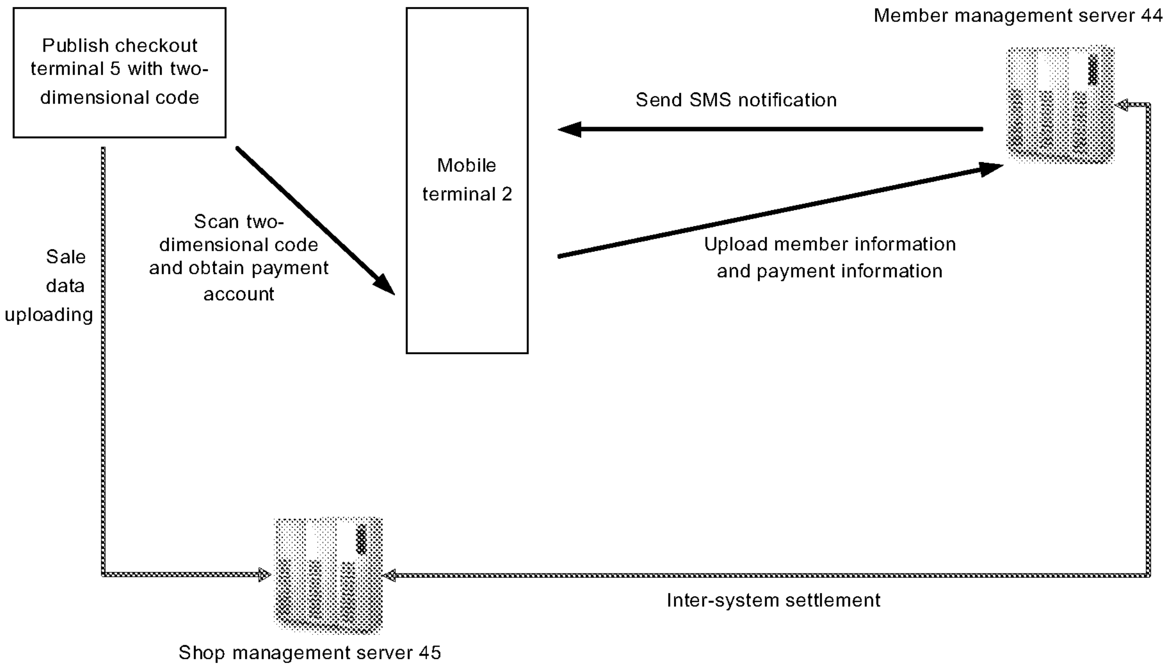
FIG. 14 is a flow chart of a eighth embodiment of a method utilizing barcode images to communicate between a mobile terminal and at least two backend servers according to the present invention.

FIG. 14 is a flow chart of a seventh embodiment of a method utilizing barcode images to communicate between the mobile terminal 2 and backend servers 41, 44 and 45 according to the present invention. The difference between the embodiments of FIG. 14 and FIG. 13 is that, the two-dimensional code 6 in FIG. 14 contains the information of the payment amount, while two-dimensional code 6 in FIG. 13 does not contain the information of the payment amount. Two-dimensional code 6 in FIG. 13 is only responsible for the behavior of payment establishment, and the detailed payment amount shall be entered by the cashier or consumer after scanning two-dimensional code 6. Two-dimensional code 6 in FIG. 14 has contained the payment amount, and mobile terminal 2 directly confirms the payment after scanning two-dimensional code 6, without the procedure of entering the payment amount.

Through the detailed embodiments in FIG. 13 and FIG. 14, the joined merchants (merchants supporting payment card) do not need to modify the checkout terminal 5, and do not need to equip with swiping card machine and communication line. As long as checkout terminal 5 has two-dimensional code 6, the payment can be completed by mobile terminal 2, and the amount in payment card can be deducted.

Figure 15:
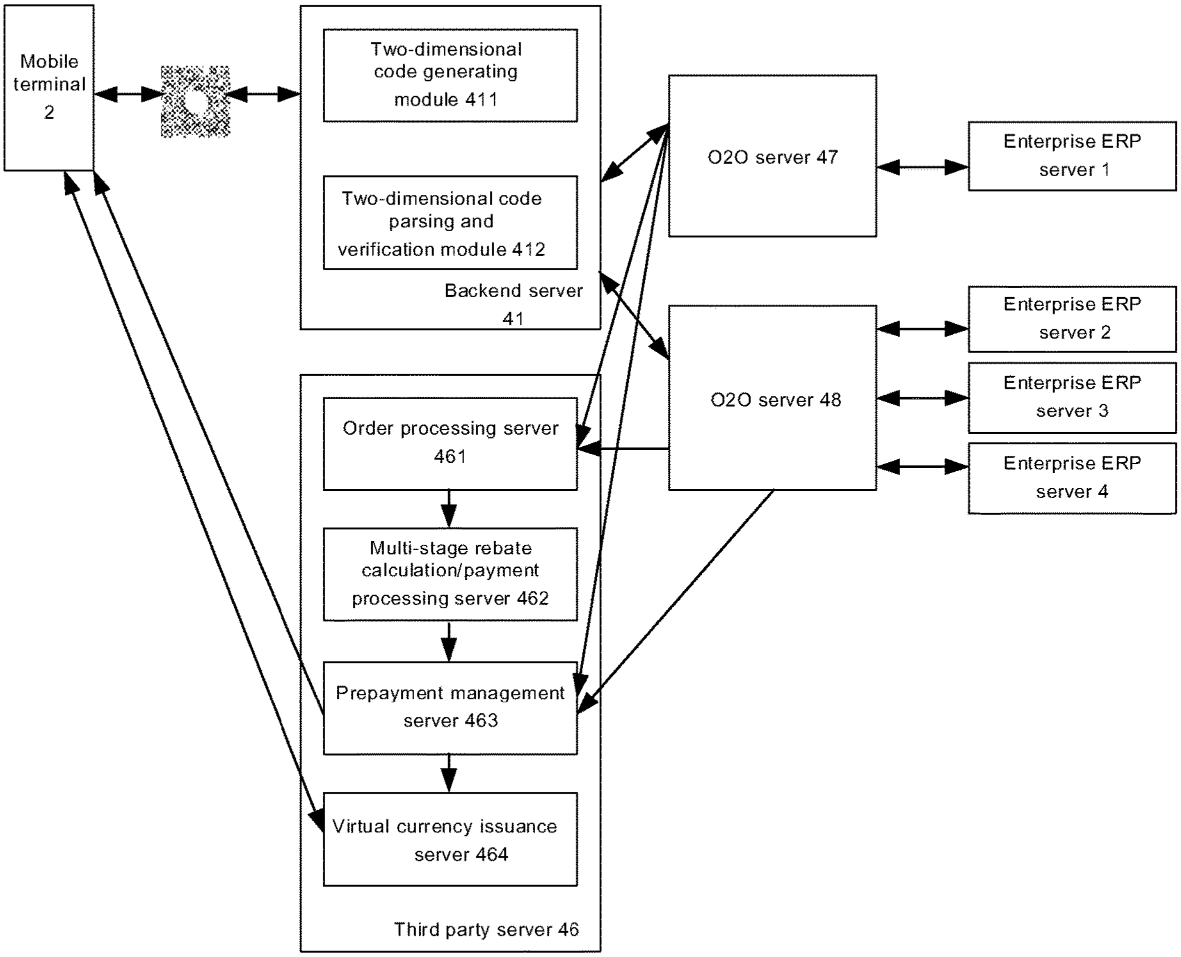
FIG. 15 is a flow chart of a ninth embodiment of a method utilizing barcode images to communicate between a mobile terminal and at least two backend servers according to the present invention.

The prepaid card mode of the detailed embodiment in FIG. 13 and FIG. 14 firstly needs to issue a prepaid card magcard with such as 5000 Yuan, anonymous and no loss reporting. The prepaid card is printed with two-dimensional code bound with this prepaid card. Smartphone installs client software and scans this two-dimensional code through client software, reads and identifies this two-dimensional code, communicates with the backend server, and relates the relevant information of the prepaid card with some specific physical identification (such as SIM card) of this Smartphone and/or client software account, which can view the swiping card records and consumption balance, etc. In the shops which can use this card, the Smartphone scans the two-dimensional code to replace the previous swiping card action on POS machine. In the detailed embodiment in FIG. 13, the consumption amount shall be entered manually on Smartphone client software after scanning the two-dimensional code. In the detailed embodiment in FIG. 14, two-dimensional code is dynamically generated. After the two-dimensional code containing consumption amount and merchant information which is dynamically generated by the Smartphone after scanning is confirmed, the consumption amount is deducted from the prepaid card balance; the consumption records can be sent to relevant parties (Smartphone user, card issuer and merchant) by phone SMS or client software internal message. FIG. 15 is a flow chart of a ninth embodiment of a method utilizing barcode images to communicate between a mobile terminal 2 and backend servers 41, 46, 47 and 48 according to the present invention.

In this embodiment, the backend server 41, the third party server 46, O2O (Online To Offline) server 47 and O2O server 48 cooperate to provide multi-stage rebate service for mobile terminal 2.

The backend server 41 contains two-dimensional code generating unit 411 which generates two-dimensional code 6 according to the preset coding rule; two-dimensional code parsing verification unit is used to parse and verify whether the two-dimensional code taken and decoded by mobile terminal 2 is generated by two-dimensional code generating unit 411. Certainly, two-dimensional code generating unit 411, two-dimensional code parsing and verification unit 412 can be used as independent servers, that is, two-dimensional code generating server 411, two-dimensional code parsing and verification server 412.

O2O server 47 and O2O server 48 are the interface of enterprise ERP server 1, enterprise ERP server 2, enterprise ERP server 3, enterprise ERP server 4 and backend server 41, the third party server 46. O2O server generally includes the merchandise synchronous interface which synchronously provides the merchant data provided by merchant to the backend server 41; merchandise query interface is used to read merchant information for querying by mobile terminal 2; order generating interface is used to transfer the order information to enterprise ERP server after mobile terminal 2 places an order; order query interface is used to read order information for querying by mobile terminal 2; function interface is used to transfer other functional data (such as transaction) of mobile terminal 2 to enterprise ERP server, and feedback to mobile terminal. The difference between O2O server 47 and O2O server 48 is that. O2O server 47 can only support one enterprise ERP server 1, while O2O server 48 could support more enterprise ERP servers (in this embodiment, it is enterprise ERP server 2, enterprise ERP server 3, enterprise ERP server 4, respectively).

The third party server 46 includes many servers, which are; order processing server 461 used to process merchandise order; multi-stage rebate calculation/payment processing server 462 used to calculate the multi-stage rebate amount to the recommender for this order generation (referring to embodiment of FIG. 10); prepaid payment management server 463 used to manage the prepaid payment of multistage rebate and manage the prepaid ledger balance, personal account balance and transaction details; virtual currency issuance server 464 used to issue the virtual currency to recommenders which provide recommendation service of mobile terminal 2.

The multi-stage rebate service in this embodiment is achieved by cooperation work of many servers. Enterprise ERP server does not need any update to communicate between backend server 41 and the third server 46 through O2O server 47 and O2O server 48. Many servers contained in the third party server 46 may provide entire services for many enterprises, including the order generation, query, multi-stage rebate calculation and delivery. Certainly, the present invention has no limitation on the server quantity contained in the third party server 46. Order processing server 461, multi-stage rebate calculation/payment processing server 462, prepaid management server 463 and virtual currency issuance server 464 can be mutually independent server, or integrated server.

The benefit effects of this embodiment lie in:

1. Help the offline physical stores to finish e-commerce without impacting the physical stores, which is, achieving organic combination of e-commerce and physical shops.

2. Help the physical shops equipped with ERP server to complete e-commerce relying on physical shops of multi-channels and multi-sales-representatives by O2O server. As to every order transacted in offline shops, even though the delivery and payment of final order processing are completed by backend e-commerce platform, it could be traced to the sales representative who obtains this order by offline channel. The sales representative (that is recommender) is awarded by suitable commission, thus the offline has the motive to actively participate in this embodiment mode.
3. Help the merchant to finish advertising and finish marketing at the same time, which is P4P (PAY FOR PERFORMANCE), advertising and marketing are paid according to the effects.

The current mode of the merchant is to put into advertising promotion fee; however, the sales volume generated by these advertisements could not be determined. This embodiment enables the advertise promotion to become the sale front end; in addition, the advertising promotion fee is to stimulate the consumer to broadcast or purchase, which is the high cost-effective mode of P4P. The advertising promotion fee is not only wasted, but also traces broadcasting and facilitates the finally purchase personnel, forming the multi-stage rebate mode of "advertising marketing pays for performance";

4. Help the merchant to achieve "advertising marketing pays for performance" mode, and simultaneously enable more consumers to mutually connect to the merchant, thus achieving optimum of entire promotion fee.

If the above P4P mode is only implemented by one enterprise, its superiority could not be fully reflected. The entire promotion cost of one merchant is very high; therefore. "interflow and interconnection mechanism" is required, so that all merchants comply with the same two-dimensional code coding and parsing rule. If the enterprise pays high attention to safety of its own data, it could independently pay the O2O server fee to enjoy O2O server independently (referring to O2O server 47 in FIG. 15); the enterprise may select cloud server of O2O server (referring to O2O server 48 in FIG. 15).

5. Achieve the issue mechanism of "super sovereignty currency" based on real economy sales scale.

Referring to FIG. 15, assumed that the enterprise has owned enterprise ERP server 1-4 (achieving the whole process of purchase-production-sale-financial cost evaluation management), the usage of P4P mode could achieve the highest cost effective: using O2O server 47 (one enterprise owns O2O server independently), or using the cloud service of O2O server 48 of the third party.

Use the unified two-dimensional code generation and parsing rule, and keep inter-connection with O2O servers 47 and 48. Enterprise submits the advertising/marketing/commission fee to the "multi-stage rebate platform" of the third party server 46 according to the sales percentage; the platform distributes to every consumer based on his contribution according to the P4P mode (the award may be in accordance with the behaviors of subordinated consumers affected after scanning, transmission, purchase and share). This may help the enterprise to establish dynamical multi-stage marking network, so that the marketing order is obtained (advertising network becoming the commercial network) during the advertising promotion (as long as the consumer scans two-dimensional code and transmit by mobile terminal, the consumer will become a member of enterprise marketing network; therefore, the enterprise's adverting fee can be theoretically "capitalized") (the marketing channel based on issuance of two-dimensional code 6 to be scanned).

When many enterprises of real economy select this mode, many enterprises extract sales volume/sales expectation percentage and store in "multi-stage rebate platform" of the third party server 46. This platform may issue "new currency Matrix" and implement in line with principle of "physical equivalent exchange". The issuance basis of "new currency Matrix" is the sales volume/sales expectation percentage extracted by many enterprise; the generation of "new currency Matrix" completely complies with "physical equivalent exchange in Marx theory", exceeding the issuance mechanism of all current sovereign currencies. The "new currency Matrix" completely complies with "real economy scale, physical equivalent exchange principle"; therefore, it can become "ideal super sovereign currency". The "new currency Matrix" is not only transacted in domestic, but also has possibility of transnational transaction. The issuance mechanism of "super sovereign currency" has significant meaning for China with real economy advantage to get rid of relying on overissue of other currencies.

As the prefer embodiment of the present invention, in the mobile terminals 2, 2', 2" . . . of the present invention, the client software communicating with the backend servers 41, 42, 43 . . . is installed in default. Open the client software to open the camera 22 in the interface of client software to take a picture of two-dimensional code 6. The client software includes decoder 23.

As another embodiment of the present invention, the decoder 23 of mobile terminals 2, 2', 2" . . . is built in hardware entity of mobile terminals 2, 2', 2" . . . (that is, the mobile terminals 2, 2', 2" . . . contain decoder 23 in default when leaving the factory, which could take a picture of and decode two-dimensional code 6). However, client software is required to extract service information and accept services of backend servers 41, 42 and 43 . . . . Therefore, after decoder 23 completes decoding and before mobile terminals 2, 2'. 2" . . . extracts service information, the backend server 41 is used to determine whether mobile terminals 2, 2', 2" . . . have installed client software. If so, continue to conduct next procedures; if not, backend server 41 automatically provides client software downloading and installation of mobile terminals 2, 2', 2" . . . .

Certainly, other backend server 42 or 43 may provide the client software downloading and installation for mobile terminals 2, 2', 2" . . . .

As another embodiment of the present invention, the decoder 23 of mobile terminals 2, 2', 2" . . . and coding information parsing unit 416 can be built in hardware entity of mobile terminals 2, 2', 2" . . . .

Because decoder 23 is built in the hardware entity of mobile terminals 2, 2', 2" . . . , it can directly take a picture of two-dimensional code 6 using camera 22 without opening client software or without installing client software, and decode using decoder 23. For example, on TV screen, computer screen or light screen which dynamically displays the contents, the camera 22 can be used to take a picture of its two-dimensional code 6.

As another embodiment of the present invention, mobile terminals 2, 2', 2" . . . are installed with other client software unmatched with coding rule of two-dimensional code 6 (two-dimensional barcode 6 contains the address of backend server 41, such as http://matrixlink.cc/1234567MX). User of mobile terminals 2, 2', 2" . . . opens other client software, takes a picture of two-dimensional code 6 for decoding; because two-dimensional code 6 contains hyperlink of backend server, mobile terminals 2, 2', 2" . . . are connected to the backend server 41. Backend server 41 determines mobile terminals 2, 2', 2" . . . have not installed the client software matched with coding rule of two-dimensional code, and the backend server 41 automatically provides the downloading and installation of client software for mobile terminals 2, 2', 2" . . . .

Figure 16:
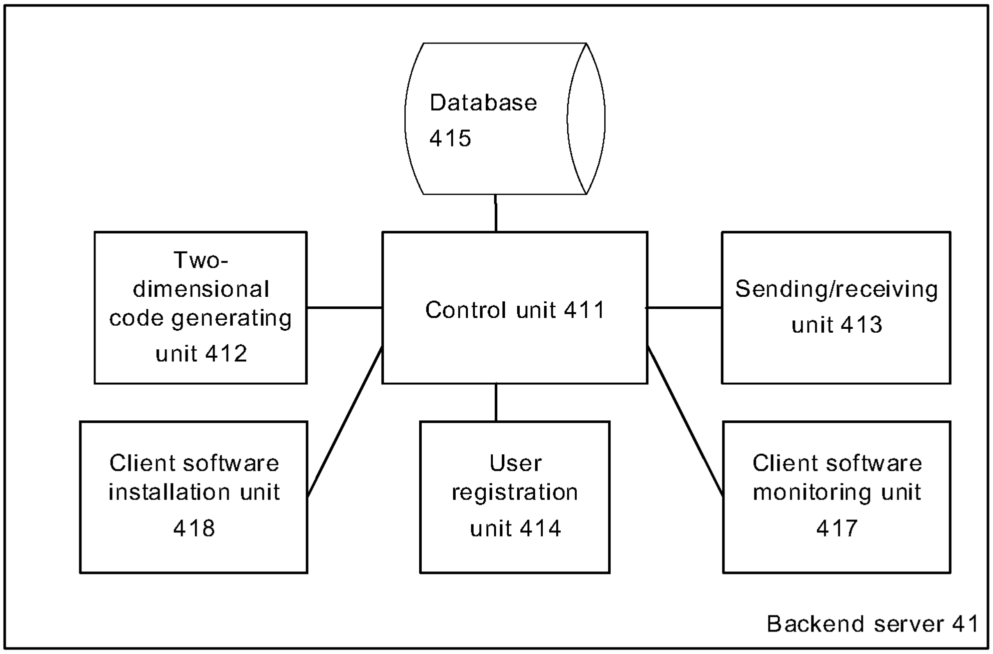
FIG. 16 is a structural block diagram of a third embodiment of the backend server in FIG. 1.

As shown in FIG. 16, FIG. 16 is a structural block diagram of a third embodiment of the backend server in FIG. 1. The difference between FIG. 16 and FIG. 4 is that, the backend server 41 in the present invention also includes client software monitoring unit 417 which is used to monitor whether mobile terminals 2, 2', 2" . . . have installed the client software matched with coding rule of two-dimensional code 6; and client software installation unit 418, which is used to automatically download and install the client software for mobile terminals 2, 2', 2" . . . when monitoring that mobile terminals 2, 2', 2" . . . have not installed client software.

Preferably, client software monitoring unit 417 may monitor the identification signal sent from the client software matched with coding rule of two-dimensional code 6. Client software monitoring unit 417 monitors whether mobile terminals 2, 2', 2" . . . have corresponding signal; in case of no signal, mobile terminals 2, 2', 2" . . . have not installed the matched client software; if there is signal, mobile terminals 2, 2', 2" . . . have installed the matched client software.

Preferably, client software monitoring unit 417 may search the program installation list of mobile terminals 2, 2', 2" . . . ; if the client software matched with coding rule of two-dimensional code 6, the client software has not been installed.

Figure 17:
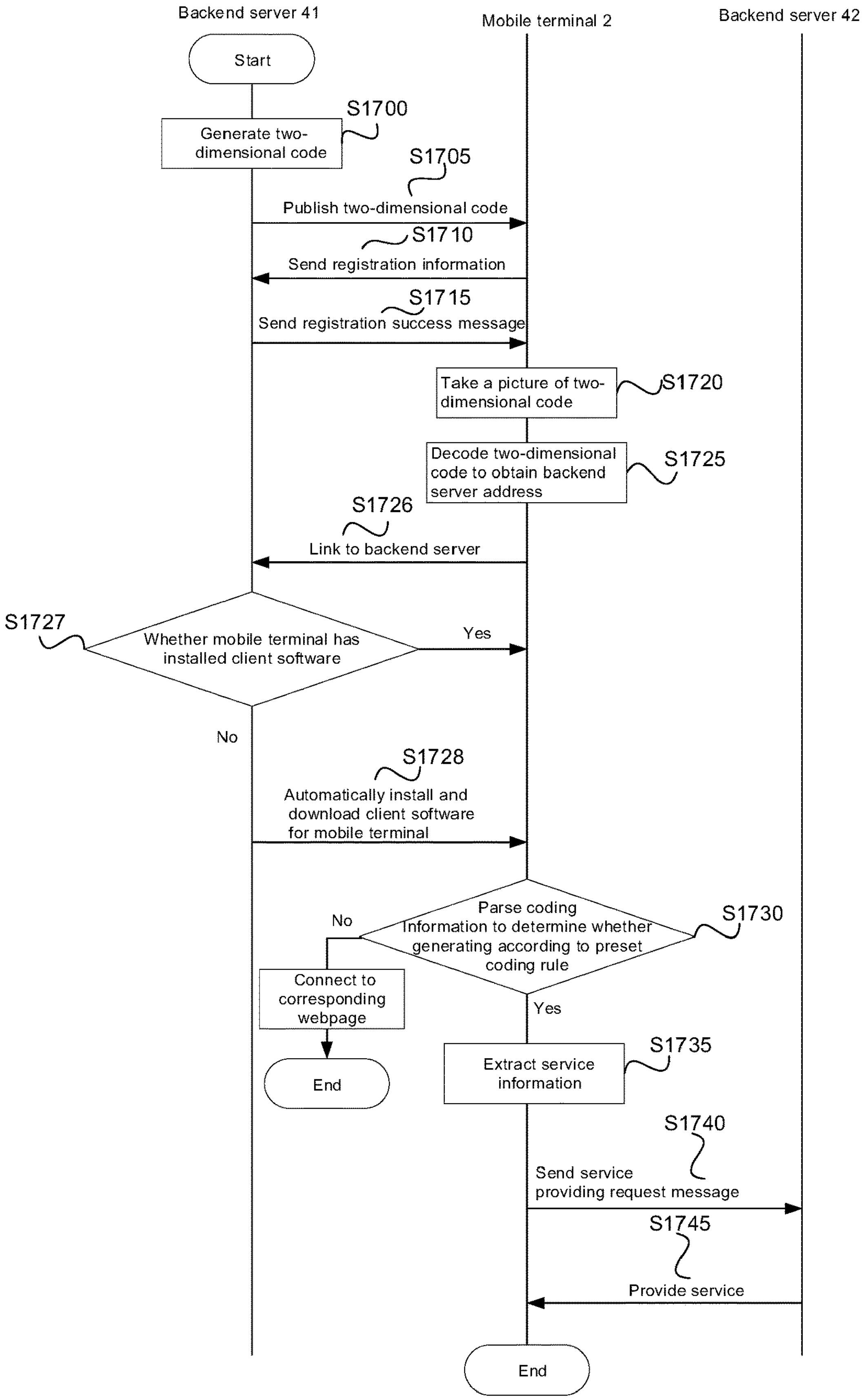
FIG. 17 is a flow chart of a tenth embodiment of a method utilizing barcode images to communicate between a mobile terminal and at least two backend servers according to the present invention.

FIG. 17 is a flow chart of a tenth embodiment of a method utilizing barcode images to communicate between a mobile terminal and at least two backend servers according to the present invention. As shown in FIG. 17, it includes the following steps:

Step S1700-Step S1715 are identical with Step S500-Step S515 in FIG. 5.

Step S1720 take a picture of two-dimensional code 6 which contains the address of backend server 41, such as http://matrixlink.cc/1234567MX. In this embodiment, open any two-dimensional code client software in mobile terminal 2 and open the camera in this two-dimensional code client software, to take a picture of two-dimensional code 6.

As another embodiment of the present invention, the camera of mobile terminal 2 is directly used to take a picture of two-dimensional code 6. The camera built in mobile terminal 2 directly takes a picture of two-dimensional code 6 without opening any two-dimensional code client software. In this embodiment, mobile terminal 2 already contains the decoder to decode two-dimensional code 6 when leaving the factory.

Step S1725 decodes two-dimensional code 6 to obtain the address of backend server 41.

Step S1726 connects mobile terminal 2 to backend server 41.

In step S1727, backend server 41 determines whether mobile terminal 2 has installed the client software matched with two-dimensional code 6; if not, execute step S1728, backend server 41 automatically downloads and installs client software for mobile terminal 2, if installed, execute step S1730.

Backend server 41 may monitor the signal of client software matched with two-dimensional code 6. If backend server 41 monitors that mobile terminal 2 has the corresponding signal, mobile terminal 2 has installed the client software matched with two-dimensional code 6; if backend server 41 monitors that mobile terminal 2 has no corresponding signal, mobile terminal 2 has not installed the client software matched with two-dimensional code 6.

Step S1730-Step S1745 are identical with Step S530-Step S545 in FIG. 5.

In this embodiment, the user of mobile terminal 2 may select any two-dimensional code client software to take a picture of and decode two-dimensional code 6, or directly take a picture of two-dimensional code 6 by the camera, which significantly improves the usage convenience of user. Moreover, if mobile terminal 2 has not installed client software matched with two-dimensional code 6, backend server 41 will automatically down and install for mobile terminal 2, and the user does not need to have any operation. Further, after the client software matched with two-dimensional code 6 is automatically installed, the user does not need to open the client software to re-take the picture and parse in client software, directly execute the next parsing step S1730. Further, incidence relation establishment between mobile terminal 2 and backend server 41 can be finished after the client software is automatically installed. The only incidence relation with backend server 41 can be established through the unique IMEI number, SIM card number of mobile terminal 2, without registration procedure, facilitating user of mobile terminal 2, so that user can obtain the services provided by backend server 42 more conveniently.

As another embodiment of the present invention, two-dimensional code 6 can be lattice diagram coded according to the preset two-dimensional code coding rule, and the lattice diagram unrecognizable or difficultly to be identified by naked eyes. When camera 22 of mobile terminal is used to directly align with the screen, decoder 23 can automatically capture and identify the lattice diagram.

Another embodiment of the present invention can be applied in the ordering process of restaurant. When consumer enters the restaurant, since the waiter is busy and so as to ask the consumer to scan the two-dimensional code 6 on the table, and this two-dimensional code contains the information of backend server 41.

1) The consumer opens camera 22 in mobile phone to take a picture of two-dimensional code 6, obtains the address and relevant parameters of backend server 41 through the decoder 23 and coding information parsing unit 416 built in mobile phone hardware entity, thus connecting to backend server.
2) Determine whether the mobile phone has installed the decoding client software corresponding to coding rule of two-dimensional code 6; if not installed, download and install decoding client software, and introduce the parsed parameters contained in two-dimensional code into automatically started client software; if installed, directly introduce the parsed parameters contained in two-dimensional code into automatically started client software;
3) Client software starts and displays the menu of the restaurant, and the menu is read and displayed according to coding rule of two-dimensional code. Comments on each dish in the menu can be viewed. Preferably, the comments are posted after the client software in consumer mobile phone scans two-dimensional code of the restaurant menu, in line with location based service (LBS). Moreover, the comments can be connected to the mobile phone, thus avoiding lots of invalid comments.

4) Order the satisfied dishes on the menu, the consumer mobile phone client software generates order information, and the client software or SMS on mobile phone of the waiter connected to two-dimensional code 6 receives the order information, including the dishes, table number, time, etc.

Preferably, the menu may also include the link to obtain discount coupon, after clicking the link, it will send two-dimensional code containing discount coupon information to the consumer mobile phone. The mobile phone client software of waiter scans and verifies two-dimensional code containing discount coupon information in consumer mobile phone, and the consumer can use this discount coupon.

Certainly, the collection method of discount coupon is not limited to this, and the present invention has no limitation on that.

The beneficial effects of this embodiment are that: menu paperless of merchant is achieved, the consumer may scan two-dimensional code 6 to give an order during waiting, and select according to the comments. Moreover, the merchant may send two-dimensional barcode containing discount coupon information to finish promotion and verification.

Referring to FIG. 17, the protocol between backend servers 41, 42 and mobile terminal 2 is MatrixLink protocol, with the principle as follows:

Protocol with http is internet-based protocol; WWW is an application system with Internet as the transmission medium, the basic transmission unit of WWW is similar with Web webpage principle, while MatrixLink protocol is the basic protocol of MatrixLink. Its working principle mechanism is also based on mobile client/server calculation model, by sense access device of mobile terminal such as NFC chip (identifying NFC reader), or camera with identification software unit (preset in mobile terminal or install later, to achieve mechanism similar with Web browser (client) and Web server (server)); above two can communicate by using similar hyper text transmission protocol Http protocol (but including MATRIXLINK coding rule). MATRIXLINK protocol may be the protocol based on TCP/IP protocol, as the application level protocol between mobile terminal and Web server, which might be universal or customized protocol, including business logic, encryption rule and operation implementation process.

The action principle of MATRIXLINK protocol includes four procedures:

(1) Connection: similar with Web browser connecting with Web server by clicking.com, the MATRIXLINK connection is the connection established to backend server through identification by using mobile terminal scanning barcode and/or aligning with image code (display screen, identified by camera shooting module of mobile terminal through UV difference of screen bright spot, not image code identified by human eyes).

(2) Request: similar with Web browser submitting request to Web server through socket. The MATRIXLINK request generally contains that the server points to parameters relevant with predefined business operation logic, in addition to establishing connection.

(3) Answer: similar with Web browser transferring http protocol to Web server after submitting the request, after Web server connects to Matrixlink protocol of mobile client side, implement affair processing according to predefined rule, and the processing result is transferred back to mobile client side, thus mobile client side starts the client software to parse predefined coding rule, displays the requested pages and implements in line with predefined processing flow, or just implements the predefined process, thus achieving predefined loop transaction processing.

Therefore, by MATRIXLINK protocol, the network connecting a person and an object, a person and a person by personal mobile terminal, is established and called as MATRIXLINK network.

Figure 18:
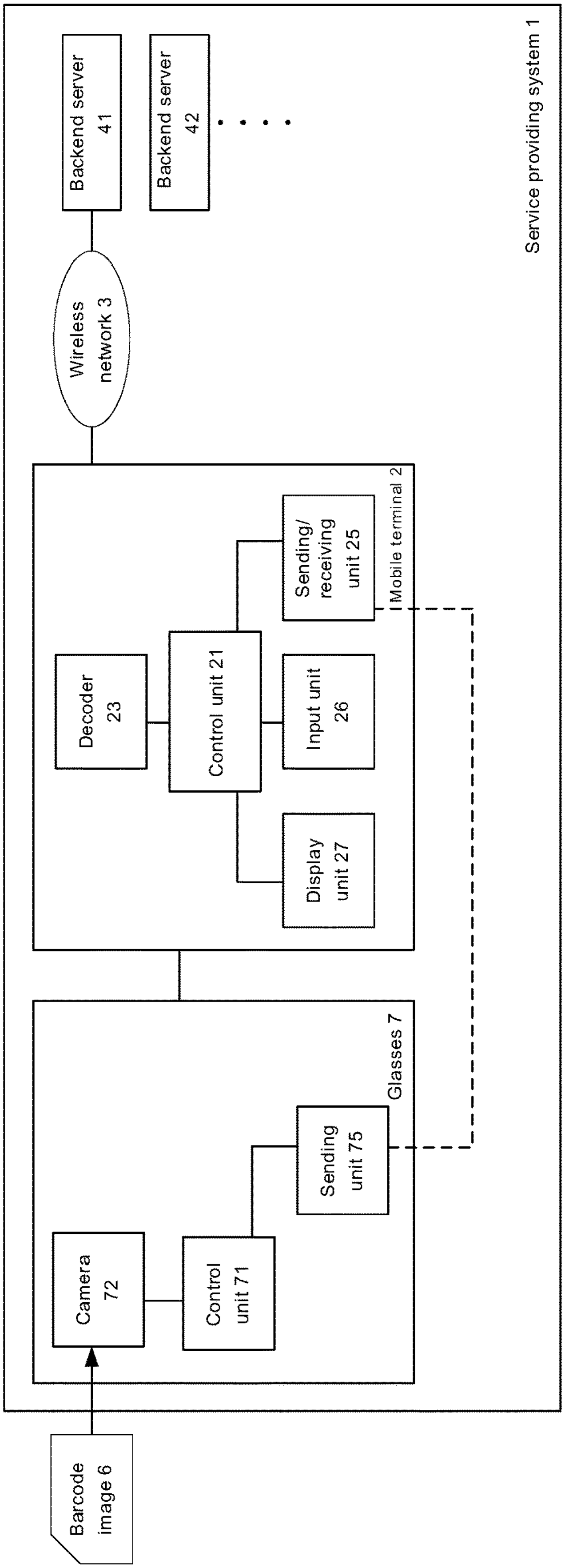
FIG. 18 is a structural block diagram of a third embodiment of the service providing system according to the present invention.

FIG. 18 is a structural block diagram of a third embodiment of the service providing system 1 according to the present invention. The difference between FIG. 8 and FIG. 1 is that, the service providing system 1 further includes the glasses 7.

Glasses 7 include the control unit 71, which is used to control signals of other units and control other units to achieve their own functions. Camera 71 is used to take a picture of barcode image 6. In this embodiment, barcode image 6 may be two-dimensional code on the magazine, or optical lattice diagrams (constituted by light and dark light, ultraviolet light or infrared ray) unrecognizable or difficultly to be identified by naked eyes. Sending unit 75 is used to send the taken barcode image 6 to mobile terminal 2. In this embodiment, sending unit 75 may be connected to mobile terminal 2 by wired method, or communicate with mobile terminal 2 by bluetooth or WIFI and other wireless methods.

Certainly, glasses 7 may further include the indication unit to indicate photograph or successful sending of barcode image 6. For example, the indication unit may be indication light. Glasses 7 may also include the setting unit to set the photograph speed and clarity. Glasses 7 also has many transformation embodiments, it is understandable that all these transformation embodiments are covered in the protection scope of the present invention.

Mobile terminal 2 includes control unit which is used to control signals of other units and control other units to achieve their own functions. The decoder 23 is used to decode the barcode image 6 received from glasses 7 to obtain coding information. Sending/receiving unit 25 is used to send the service providing request message to one of the backend server 42 . . . , and receive the service from this backend server. Input unit 26 is used to enter the information required by backend servers 41, 42 . . . . Display unit 27 is used to display the information required by backend servers 41, 42 . . . .

Certainly, the present invention is not limited to this, glasses 7 may be other parts wearable by the human body, such as hat, bracelet etc.

Figure 20:
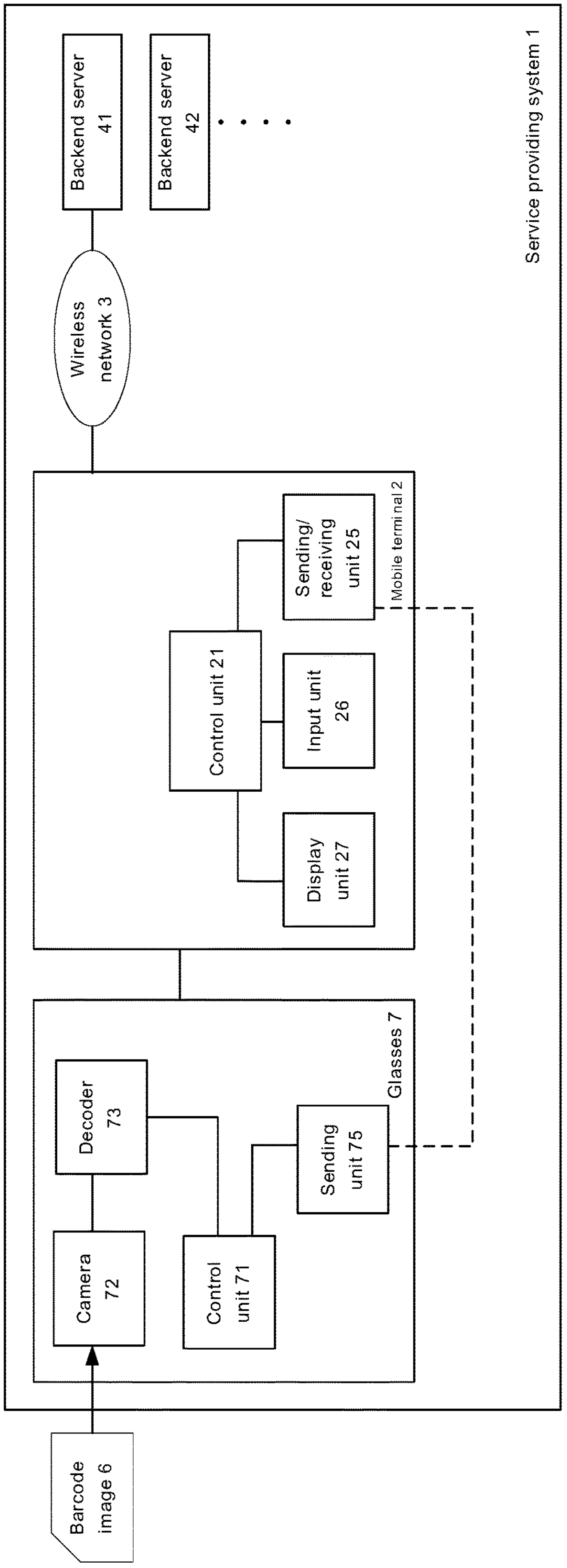
FIG. 20 is a structural block diagram of a fifth embodiment of the service providing system according to the present invention.

In another embodiment of the present invention, as shown in FIG. 9, the glasses 7 include decoder 73, while mobile terminal 2 does not include the decoder. Sending unit 75 sends the decoded coding information to mobile terminal 2. The decoder 73 may be connected to camera 72, or connected to control unit 71, or simultaneously connected to control unit 71 and camera 72. As shown in FIG. 20, the camera 72 is connected to decoder 73, and decoder 73 is connected to control unit 71. The present invention has no limitation on the connection method of the decoder 73.

As another embodiment of the present invention, mobile terminal 2 can be replaced by watch or other parts wearable by human body. Certainly, the watch or other parts wearable by human body must be able to complete all functions of mobile terminal 2, and normally communicate with backend servers 41, 42 . . . .

In the embodiment of the present invention, glasses 7 are added. Glasses 7 are built with camera 72, so the user may take a picture of dimensional barcode 6 at any time after wearing the glasses, without taking out mobile terminal 2 and active the photograph action, which improves the user convenience. Furthermore, many embodiments of communication method between mobile terminal 2 and backend server 41, 42 . . . are applicable for communication between mobile terminal 2 and backend servers 41, 42 . . . of this embodiment.

As another embodiment of the present invention, mobile terminal 2, watch or other parts wearable by human body can communicate with one backend server, which is, the function of many backend servers 41, 42 . . . can be achieved by one server. In details, that backend server 41 providing the functions, such as two-dimensional code generation, user registration, two-dimensional code parsing and verification, as well as backend server 42 providing the services are all realized by one backend server.

Referring to FIG. 10, FIG. 15-FIG. 19, one preferable embodiment of the communication method of the present invention is further illustrated.

Referring to FIG. 15, enterprise A prepares for the new product AP1 to be launched in the market through the backend server 41. The enterprise ERP server 1 (including e-commerce processing), presets the sales volume and sales amount of new product AP1, and generates two-dimensional code 6 according to the predefined rule, publishes through TV issue channel and shop issue channel.

In addition, extract AP1% of AP1 sales as the advertising fee for market promotion, sign with and pay to the third party server 46 (may prepay or pay in stage). This mode covers advertising release platform such as TV station, multi-stage broadcasting organizer, two-dimensional code creativity and/or technical producer, as well as management party of server 46, etc.

Two-dimensional barcode 6 is released by TV station, and the consumer wears glasses, earphone or other parts (FIG. 18, FIG. 19) when watching TV programs. The optical dot matrix on TV screen is invisible by naked eyes, but it can be identified by glasses in FIG. 18, and parsed by the decoder in mobile terminal 2 embedded with touch core engine software.

Figure 19:
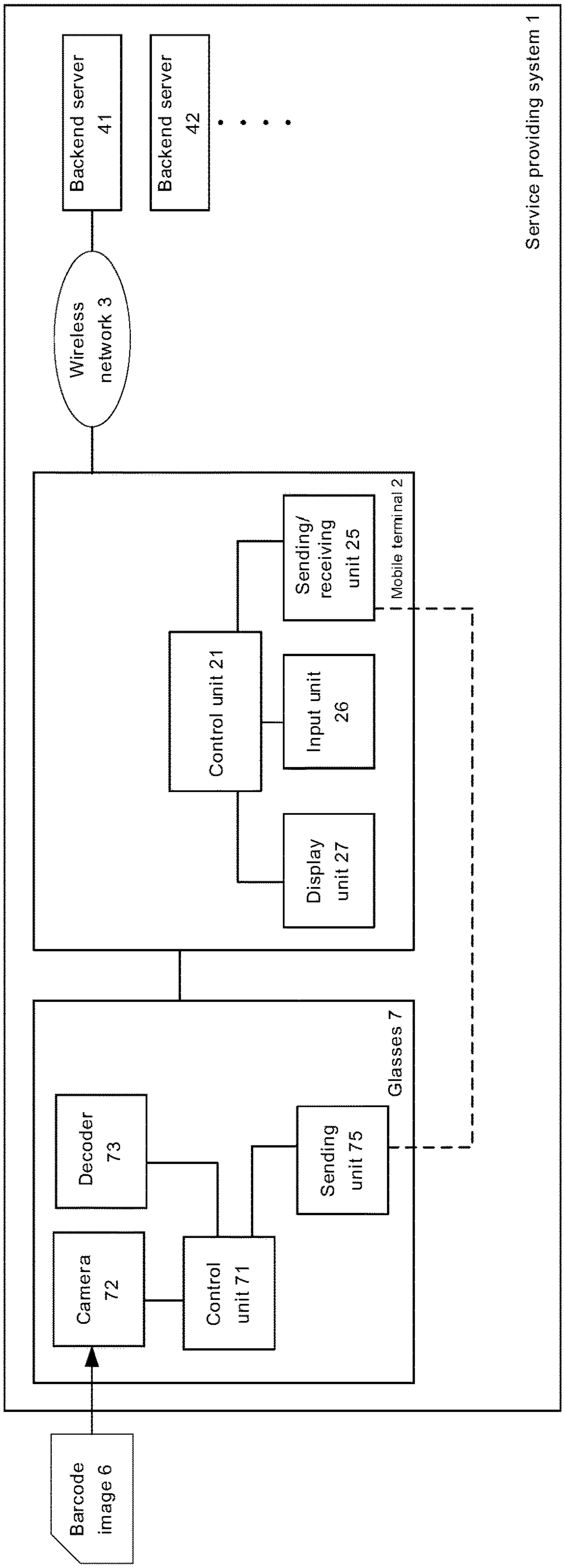
FIG. 19 is a structural block diagram of a fourth embodiment of the service providing system according to the present invention.

As long as the consumer stares at the TV screen for 10 seconds (the time period may be set), the optical dot matrix can be automatically captured. Further, the consume drivers the connected (wired or wireless connection) mobile terminal/watch (FIG. 18. FIG. 19), and communicates with the backend server 42. The mobile terminal 2 or backend server 42 of the consumer has the coding information of optical dot matrix, and the consumer can further view the AP1 introduction by his client software. In addition, the consumer may post comments, answer investigation question and get discount coupon, or re-generate and publish two-dimensional code 6' (referring to FIG. 10), so that mobile terminal 2 becomes the next level of sale representative developed by TV channel of product AP1 two-dimensional code 6.

Referring to FIG. 15, mobile terminal 2 scans two-dimensional code 6 and gives an order, its coding information is firstly parsed and verified 1*b* server 41. After the verification, it is transferred to O2O server 47 (enterprise private) to achieve TV channel management and other functions, and then transferred to enterprise ERP server 1 to complete the order processing. The order processing result is feedback to order processing server 461, server 462 finishes rebate calculation, server 463 extracts corresponding proportion from the prepayment and returns to mobile terminal 2 (user of mobile terminal 2 has the payment/gathering account bound with mobile terminal 2). TV station, two-dimensional technical producer, the third party server 46 and other related parties.

Through the detailed embodiments of FIG. 13 and FIG. 14, the joined merchants (such as merchants supporting prepaid card) do not need to modify the checkout terminal 5, and do not need to equip with swiping card machine and communication line. As long as checkout terminal 5 has two-dimensional code 6, the payment can be completed by mobile terminal 2, and the amount in payment card can be deducted, thus completing the process of selling merchandise AP1 at counter.

Wherein, the currency contained in the issued prepaid card does not have to be really current money, it may be equivalent measurement unit issued by server 46, which has the set exchange proportion together with the merchandises managed by server 46, and can complete "physical exchange" in the merchandise group. When many enterprises with real economy select to join in the mode promoted by server 46, server 46 may issue "new currency Matrix" and implement in line with principle of "practical equivalent exchange".

In the detailed embodiment, the glasses, watch and mobile terminal can be embedded in "touch core engine". "Touch core engine" is a software/middleware, which drives the optical camera to identify the optical signal. The optical signal can be optical signal such as visible light, or infrared ray, ultraviolet light or light and dark light. The read original optical information applies two-dimensional code/identification principle, converted by classification distinguishing, error correction, matching, seizing and/or signal format, to generate operation instruction to backend server. The operation instruction is transferred to the backend server by mobile terminal, and further process based on transaction management according to corresponding rule, to achieve functions such as download, opening APP, e-commerce, transaction and payment.

As a preferred embodiment of the present invention, the user of the mobile terminals 2, 2', 2" . . . certainly can perform user registration without through the mobile terminals 2, 2', 2" . . . . For example, user registration can be completed through a personal computer, for example, a desktop computer or a notebook computer. Certainly, the desktop computer or notebook computer must be able to communicate with the backend server 41.

The above describes preferred specific embodiments of the present invention in detail. It should be understood that, people skilled in the art can make lots of modifications and variations according to the concept of the present invention without creative efforts. Therefore, any technical solution that people skilled in the art can obtain through logical analysis, reasoning or a finite number of experiments on the basis of the prior art according to the concept of the present invention should fall within the scope as defined by the claims.

The invention claimed is:

1. A barcode image-based communication apparatus, comprising:
   - a mobile terminal configured for acquiring a barcode image; and
   - a first backend server and a plurality of second backend servers in network communication with the first backend server;
   - wherein the first backend server and at least one of the second backend servers communicate with the mobile terminal;
   - wherein services and service-related information are respectively provided by each of the second backend servers, where the service-related information is generated into corresponding barcode images based on a coding rule uniformly followed by the plurality of second backend servers;

wherein the mobile terminal is further configured for decoding the acquired barcode image, and after obtaining coding information corresponding to the barcode image, sends the coding information to the first backend server to parse wherein the first backend server parses coding information corresponding to the barcode image acquired by the mobile terminal, and verifies the coding rule of the acquired barcode image by determining whether the acquired barcode image and the corresponding coding information are generated based on the uniformly followed coding rule;

when it is determined that the acquired barcode image and the corresponding coding information are generated based on the uniformly followed coding rule, the second backend server provides the service corresponding to the acquired barcode image to the mobile terminal.

2. The communication apparatus according to claim 1 further includes one or more other backend servers, other than the first backend server and one of the second backend servers, the one or more other backend servers providing services different from those provided by the first backend server and one of the second servers, respectively;

the other backend servers are in network connection with the first backend server and/or the second background server so as to work in coordination with the first backend server and/or the second backend servers.

3. The communication apparatus according to claim 1, wherein the mobile terminal comprises an image acquiring unit.

4. The communication apparatus according to claim 3, wherein the image acquiring unit is a camera or a webcam.

5. The communication apparatus according to claim 1, wherein the first backend server is further configured for decoding the barcode image obtained by the mobile terminal, and after obtaining the coding information corresponding to the barcode image, parsing the coding information.

6. The communication apparatus according to claim 1, wherein:

generating by the first backend server, based on the uniformly followed coding rule, coding information and a barcode image corresponding to the coding information.

7. The communication apparatus according to claim 1, wherein the barcode image obtained by the mobile terminal is associated with an operation instruction directed to a corresponding backend server which is transmitted to the corresponding backend server.

8. A barcode image-based communication method, comprising:

acquiring, by a mobile terminal, a barcode image;

decoding the barcode image to obtain coding information corresponding to the barcode image; and communicating, by the mobile terminal, with a first backend server and at least one of a plurality of second backend servers in network communication with the first backend server;

wherein services and service-related information are respectively provided by each of the second backend servers where the service-related information is generated into corresponding barcode images based on a coding rule uniformly followed by the plurality of second backend servers;

wherein the first backend server parses the coding information corresponding to the barcode image acquired by the mobile terminal, and verifies the coding rule of the acquired barcode image be determining whether the acquired barcode image and the corresponding coding information are generated based on the uniformly followed coding rule;

when it is determined that the acquired barcode image and the corresponding coding information are generated based on the uniformly followed coding rule, the second backend server provides the service corresponding to the acquired barcode image to the mobile terminal;

one or more other backend servers, other than the first backend server and one of the second backend servers, providing services different from those provided by the first backend server and one of the second backend servers, respectively; the other backend servers are in network connection with the first backend server and/or the second backend servers so as to work in coordination with the first server and/or the second backend servers; and wherein decoding the barcode image is implemented by the mobile terminal which, after obtaining the coding information corresponding to the barcode image, sends the coding information to the first backend server to parse.

9. The communication method according to claim 8, wherein decoding the barcode image is implemented by the first backend server which, after obtaining the coding information corresponding to the barcode image, parses the coding information.

10. The communication method according to claim 8, including:

generating by the first backend server, based on the uniformly followed coding rule, coding information and a barcode image corresponding to the coding information.

11. The communication method according to claim 8, wherein:

the barcode image obtained by the mobile terminal is associated with an operation instruction directed to the corresponding backend server which is transmitted to the corresponding backend server.

12. A mobile terminal for communicating based on a barcode image, comprising:

an image acquiring unit configured for acquiring the barcode image; and a sending/receiving unit configured for communicating with a first backend server and at least one second backend server of a plurality of second backend servers in network connection with the first backend server;

wherein services and service-related information are respectively provided by each of the second backend servers the service related information respectively provided by each of the second backend servers, the service related information is generated into corresponding barcode images based on a coding rule uniformly followed by the plurality of second backend servers;

wherein the sending/receiving unit of the mobile terminal is further configured for transmitting the acquired barcode image or corresponding coding information to the first backend server, such that the first backend server parses the coding information corresponding to the barcode image to determine whether the acquired barcode image and its corresponding coding information are generated according to the uniformly followed coding rule;

when it is determined that the acquired barcode image and the corresponding coding information are generated based on the uniformly followed coding rule, one of the second backend servers provides the service corresponding to the acquired barcode image to the mobile terminal; and a decoding unit configured for decoding the obtained barcode image and after obtaining coding information corresponding to the barcode image, sending the coding information to the first backend server to parse.

13. The mobile terminal according to claim 12, further comprising:

a control unit configured for generating signals for controlling respective other units of the mobile terminal and controlling the respective other units to implement their respective functions.

14. The mobile terminal according to claim 12, wherein, the sending/receiving unit is configured for sending registration information to the first backend server or to one of the second backend servers for providing service corresponding to the barcode image, and receiving registration success information; wherein the sending/receiving unit is configured for sending a service providing request message to one of the second backend servers for providing the service corresponding to the barcode image, and receiving the service from one of the second backend servers.

15. The mobile terminal according to claim 12, further comprising:

an input unit configured for inputting information required to input by the second backend server so as to provide services.

16. The mobile terminal according to claim 12, further comprising:

a display unit configured for displaying information required to display by the second backend server in order to provide services.

17. A first backend server for communicating based on a barcode image, comprising:

a control unit configured for generating signals for controlling respective other units of the first backend server, and configured for controlling the respective other units to implement their respective functions;

a sending/receiving unit configured for communicating with a mobile terminal and communicating with other backend servers;

wherein the other backend servers include a plurality of second backend servers in network connection with the first backend server, wherein services and service-related information are respectively provided by each of the second backend servers, the service related information is generated into corresponding barcode images based on a coding rule uniformly followed by the plurality of second backend servers;

wherein the first backend server and at least one of the second backend servers communicate with the mobile terminal; and a processing unit configured for processing coding information included in the barcode image acquired by the mobile terminal, and parsing coding information corresponding to the acquired barcode image to determine whether the acquired barcode image and the corresponding coding information are generated based on the uniformly followed coding rule;

when it is determined that the acquired barcode image and the corresponding coding information are generated based on the uniformly followed coding rule, one of the second backend servers provides the service corresponding to the acquired barcode image provides to the mobile terminal;

the sending/receiving unit of the first backend server receives an operation instruction sent by the mobile terminal, the operation instruction associated with the barcode image obtained by the mobile terminal.

18. The first backend server according to claim 17, further comprising:

a barcode image generating unit configured for generating, for the service provided by respective second backend servers, coding information corresponding to the service information based on the uniformly followed coding rule, and generating a barcode image corresponding to the coding information.

19. The first backend server according to claim 17, further comprising: a database unit configured for storing user registration information, wherein the first backend server may invoke information in the database unit at any time.

20. The first backend server according to claim 19, wherein, the database unit may be located inside of or external to the first backend server.

* * * * *